United States Patent
Quatrano et al.

(10) Patent No.: US 6,748,420 B1
(45) Date of Patent: Jun. 8, 2004

(54) METHODS AND APPARATUS FOR PROVIDING SHARED ACCESS TO AN APPLICATION

(75) Inventors: Stephen R. Quatrano, Lexington, MA (US); Charles D. Cummings, Lowell, MA (US); Andrew R. Cleasby, Marblehead, MA (US); Brian S. Gladstein, Stanford, CA (US); Jeffrey J. Anuszczyk, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 587 days.

(21) Appl. No.: 09/685,725

(22) Filed: Oct. 11, 2000

Related U.S. Application Data

(60) Provisional application No. 60/167,551, filed on Nov. 23, 1999.

(51) Int. Cl.[7] .................................................. G06F 15/16
(52) U.S. Cl. ..................... 709/205; 709/204; 709/227; 709/228
(58) Field of Search ................................ 709/205, 204, 709/227, 228, 220; 370/260, 261, 262, 270, 432; 345/751, 753; 711/118, 126

(56) References Cited

U.S. PATENT DOCUMENTS

| | | | | |
|---|---|---|---|---|
| 5,861,883 A | | 1/1999 | Cuomo et al. ............... 345/326 |
| 5,862,330 A | * | 1/1999 | Anupam et al. ............. 709/204 |
| 5,941,957 A | * | 8/1999 | Ingrassia et al. ............. 709/248 |
| 5,987,376 A | * | 11/1999 | Olson et al. ................. 701/201 |
| 6,078,948 A | * | 6/2000 | Podgorny et al. ........... 709/204 |
| 6,192,394 B1 | | 2/2001 | Gutfreund et al. .......... 709/204 |
| 6,230,171 B1 | * | 5/2001 | Pacifici et al. .............. 715/512 |
| 6,237,025 B1 | | 5/2001 | Ludwig et al. ............. 709/204 |
| 6,256,389 B1 | | 7/2001 | Dalrymple et al. ......... 379/900 |
| 6,295,551 B1 | * | 9/2001 | Roberts et al. ............. 709/205 |
| 6,317,777 B1 | | 11/2001 | Skarbo et al. .............. 709/204 |
| 6,334,141 B1 | | 12/2001 | Varma et al. ............... 709/205 |
| 6,411,989 B1 | * | 6/2002 | Anupam et al. ............ 709/204 |
| 6,567,851 B1 | * | 5/2003 | Kobayashi .................. 709/228 |
| 6,584,493 B1 | * | 6/2003 | Butler ........................ 709/204 |

OTHER PUBLICATIONS

Ganghan et al "A knowledge of sharing and collaboration system model based on the Internet." IEEE 1999.*

* cited by examiner

*Primary Examiner*—Jack B. Harvey
*Assistant Examiner*—Tam T. Phan
(74) *Attorney, Agent, or Firm*—Chapin & Huang, LLC; Barry W. Chapin, Esq.

(57) ABSTRACT

The system of the invention provides a collaboration adapter which can be integrated into a web server or a web/application server to allow multiple computer user participants to access a single shared session to an application in a collaborative manner. The system of the invention allows a participant to create a shared session and to associate a participant identity to the shared session as the shared session owner. From thereon, participants can join the shared session and submit requests for application response information to the web server containing the collaboration adapter. In cases where the application response information must be obtained from the application, the invention substitutes participant session identification information in an original participant request with shared session identification information to create an altered request and then forwards the altered request to the application.

56 Claims, 10 Drawing Sheets

METHODS AND APPARATUS FOR PROVIDING SHARED ACCESS TO AN APPLICATION

CLAIM TO BENEFIT OF EARLIER FILING DATE AND RELATION TO CO-PENDING PROVISIONAL PATENT APPLICATION

The present invention is related to, and claims the benefit of the filing date of, U.S. Provisional Patent Application Serial No. 60/167,551, entitled "WEB/APPLICATION SERVER COLLABORATION ADAPTER FOR COLLABORATIVE ELECTRONIC COMMERCE," filed on Nov. 23,1999, now abandoned which is assigned to the sane assignee as the present invention. The teachings and contents of this reference co-pending Provisional Patent Application are hereby incorporated herein by reference in their entirety.

RELATION TO PATENT APPLICATIONS

The present invention is related to the following patent applications:
1. U.S. patent application Ser. No. 08/852,764, entitled "METHOD AND APPARATUS FOR COORDINATING INTERNET MULTI-MEDIA CONTENT WITH TELEPHONE AND AUDIO COMMUNICATIONS," filed on May 7, 1997, now U.S. Pat. No. 6,295,551; and
2. U.S. patent application Ser. No. 09/347,870, entitled "COPY SERVER FOR COLLABORATION AND ELECTRONIC COMMERCE" filed on Jul. 6, 1999, now U.S. Pat. No. 6,675,216.

The entire teachings and contents of these two related reference patent applications are hereby incorporated herein by reference in their entirety.

FIELD OF THE INVENTION

The present invention generally relates to systems for providing shared access to a software application, and more particularly, to systems and techniques which provide concurrent access by multiple participants to a single shared session of a software application served by a web server.

BACKGROUND OF THE INVENTION

Due to the widespread use and popularity of computer networks such as the Internet, software application developers have developed software applications which a computer user can access remotely over a network. As an example, a computer user can use web browser software to access, via the World Wide web suite of protocols, a web server that provides access to, or "serves" a software application. Typically, the web server operates as a front-end to receive requests from the web browser software and to forward those requests to the software application. The software application then performs some processing in response to receipt of the request and returns application response information to the web server. The web server then forwards the application response information back to the web browser software over the computer network in the form of a web page which the browser can display for use by the computer user.

Many applications which web servers serve in this manner are transactional in nature. The application receives requests via the web server that originate from specific client browsers associated with specific computer users. The application processes those requests in relation to some application data associated with those individual computer users as specified in some manner within the requests. Once processed, the application returns application response information that is customized or personalized to the identity of the computer user associated with the web browser that originated the request. Such multi-user applications can typically handle requests from many users concurrently, with each set of requests from each user defining a particular set of transactions carried out on behalf of that user alone.

As a simple example, a computer user may use a web browser to connect to a web server provided on the Internet by a bank or other business institution. Via the web browser, the computer user may query a financial software application served by the web server to determine bank balances, stock holdings, or other transaction information. Such information is generally specific to the user originating the request. Other computer users using other web browsers may provide similar queries to the web server to obtain information specific to those users. These types of web and application server arrangements support a distinct communications session for each respective computer user to manage a set of respective transactions related to that user.

In certain instances, a computer user accessing a web server may request or require assistance from another person to properly interact with a web site (a web server providing access to an application). Perhaps the computer user is unfamiliar with the application being served by the web server and therefore may require some assistance during initial attempts to interact with the application. The computer user might be able to place a telephone call to a representative or agent within a call center operated by the institution (business, agency, etc.) that provides the web site to ask questions about how to interact with the software application served from the site. Based on the advice of the agent, the computer user is then able to properly interact with the software application.

The ease by which a computer user is able to contact a representative or agent associated with a particular web site defines a level of customer relationship management (CRM) provided by the business or other institution within its call or support center in relation to the web site. Some conventional web sites, for instance, allow computer users to send email containing questions to the support center associated with the web site. An agent or representative within the support or call center can receive the email and reply to the customer via a callback (via telephone) or can simply reply to the customer using e-mail.

In other cases, a computer user may select a callback feature via their computer which automatically establishes a telephone call between an agent and the computer user. In the case of an automatic callback, assuming the computer user can access the application via their browser over the computer network (e.g., via a dedicated network connection) while simultaneously receiving the callback (e.g., via a telephone call), the agent or representative of the institution associated with the web site can guide the computer user through the process of interacting with the web site application in real-time. This simple form of interaction between the computer user and the agent or representative is called collaboration.

Another form of collaboration occurs when two or more people (e.g., a customer and an agent) share access to a software application. In the context of a web site serving a particular software application, conventional collaboration techniques may allow, for instance, a computer user such as a customer to first interact with the software application to enter or provide some information or data which is maintained within the software application. Subsequently, possibly in response to the customer calling or sending an email to the agent of the institution providing the application, an agent user may further interact with the application via an agent computer to view and/or manipulate the data entered by the computer user.

By way of example, suppose a computer user interacts with a retailing web site to make a purchase but incorrectly enters his or her address information and is unable to determine how to alter the address information for correction. The user may subsequently provide email or place or request a telephone call to a call center staffed with agents responsible for assisting customers associated with the retailing web site. In response to receiving the correct address information from a customer (via an email or the telephone call), an agent can access the application to retrieve the order placed by the customer to update the customer address information. The update operation may be made while the customer interacts with other portions of the retailing web site besides the address information portion. When the customer returns to the portion of the web site containing that customers address information, the customer may observe that the address has been properly updated based on the collaboration between the customer and the agent.

Another prior art mechanism providing collaboration between two users and a software application over a computer network is called a proxy browser or proxy server. Generally, a proxy server is a software entity that operates in-between computer user web browsers and a web server that serves an application. The proxy server contains proxy information (e.g., proxied web pages) obtained from the application via the web server during an initial user request for the information. When a proxy server receives a new web page of information from the application, the proxy server replaces links within that page of information with links corresponding to information (e.g., web pages) provided within the proxy server. The proxy server then provides or serves the altered or proxied page(s) to other users that request the same information (i.e., that request the same page) as the initial request.

As an example of the operation of a proxy server, if page "A" of an application references application pages "B" and "C" (e.g., via hyperlinks) a conventional proxy server coupled to a web site serving the application will replace references (e.g., links) to application pages "B" and "C" in a proxy server version of page "A" (i.e., the proxied page "A") with references to proxy server versions of pages "B" and "C" (i.e., proxied pages "B" and "C"). The proxy server thereafter may handle subsequent user requests for page "A" from the web server by serving the proxied page "A" from the proxy server. When a user viewing proxied page "A" selects, via their browser, a link to page "B" or "C," those links will reference the proxied pages "B" and "C" instead of the pages "B" and "C" located on the actual web server, since the proxy server replaced the links with references to the proxied pages. Proxy servers thus off-load some of the server processing from the web server. If the proxy does not have the proxied pages, then the request will be forwarded to the web server to obtain the page and the proxy server will cache the subsequent response.

SUMMARY OF THE INVENTION

The conventional collaboration techniques discussed above suffer from a variety of drawbacks. For example, conventional collaboration techniques may not offer concurrent access to identical information provided to or from an application served by a web server on behalf of both a computer user (e.g., a web site customer) and an agent or representative with which the computer user collaborates. That is, the design of conventional collaboration systems makes it inherently difficult and in most cases impossible to allow, for instance, an agent to manipulate computer user data (e.g., transactional data) within the application while such manipulations are concurrently apparent to the computer user associated with the transactional data.

Conventional web based application servers (i.e., web servers that provide access to applications) are generally not designed to support concurrent access to the same application information such as transactional data on behalf of multiple users at the same time via a single application session. This is primarily due to the fact that conventional web application servers associate a single communications session with all transactions for a single computer user. The communications session is generally an HTTP session between a specific computer user's web browser and the web server. The HTTP session is often identified by one or more unique values called "cookies" that are exchanged between the application and the user's browser. For example, when a computer user requests a bank transaction, the user's browser passes cookie information specifically associated with that computer user to the bank web server which then forwards that cookie on the application. The application can identify and authenticate specific computer users requesting transactions from other users based on the cookie information provided from each user's browser.

A collaboration difficulty arises using conventional collaboration technology since it is nearly impossible for another computer user such as the agent or representative in the above examples to step in and control the HTTP user session associated with the initial computer user and to assume the identity of that computer user to further carry on or assist in interaction with the application using that session. One reason for this is that the agent does not have access to cookie and/or other session identification information associated with the computer user's session. In other words, conventional web server and application design only supports one-to-one interaction between a single computer user and an application, and does not allow multiple users to share a single communications session and its associated transactions with an application. In conventional systems, multiple computer users obtain different application response information when interacting with a web or application server which is determines based on each user's identity.

Conventional technologies do exist which allow multiple users to access in application in a concurrent manner. An example of such technology is the proxy server noted above which resides between the computer user browsers and the web server. Proxy browsers work well when application response information (e.g., content) that is returned to each computer user is the same. That is, when an application returns a web page that has non-personalized, non-dynamic and/or not transactional information, then each user can receive the same page.

However, conventional proxy servers and related technologies (e.g., proxy browsers) do not support true collaboration on related transactional information within an application on behalf of multiple users, but rather, merely serve as a conduit through which separate transactional requests associated with separate users are handled by an application using separate sessions or threads. In the case of transactional data, a conventional proxy server must still provide each separate transactional request to the web server which then presents each request to the application in the order in which they were received. The application associates each transactional request with a specific computer user session and returns a result retrievable by one specific user. If two users request the same transactional information, the application will handle each request as a separate transaction and will process each request redundantly.

The present invention differs from conventional collaboration technologies in that the present invention allows two or more participants such as a computer user and an agent to share dynamic, personalized, secure and transactional content (e.g., application response information) generated by a web based application or web application server. The system of the invention facilitates collaboration without the need or use of a proxy server or proxy browser between computer user browsers and the web or application server equipped with the invention. The invention also allows multiple participants to access information provided from an application without modifications being required to the application logic and avoids the application having to process the same transaction redundantly for each user requesting the same information.

The present invention is preferably embodied in part as a collaboration adapter that may be incorporated into a web server. In this capacity, the system of the invention is able to create a collaborative shared session that allows two or more independent sessions (e.g., two different computer user HTTP sessions) to share a single shared application session existing in the web or application server. Generally, the system of the invention regulates access to the single shared session by multiple session participants by including a copy service that stores or caches application response information (e.g., web pages containing transactional information) received from the application (e.g., in response to an initial request from a participant for the information) such that the application response information can be provided repeatedly to each requesting participant to the collaborative shared session in the event that those participants request the same information.

Since the system of the present invention caches application response information, such information can be provided repeatedly without requiring interaction with the application itself, therefore eliminating any additional overhead of producing identical application response information (e.g., identical web pages) for multiple requesting participants. Using the invention, application behavior is only performed once in response to an initial request made under a participant identity associated with the shared session (i.e., the owner participant identity), and similar subsequent requests cause the system of the invention to bypass the application behavior preventing redundant application transactions.

The system of the invention provides the shared session between the web server and the application by creating shared session identification information which can include, for example, shared session cookies as well as shared session participant identification information for each participant computer user who accesses the application via the shared session. That is, the invention provides the application with the appearance of a single user session (i.e., the shared session) that is controlling the application.

As will be further explained, by uniquely sharing cookie state contained within shared session identification information and participant session identification information, the collaboration adapter provided by the system of the invention allows shared session participants to exchange cookies within the collaboration adapter of the system of the invention without having the cookies copied to each individual participant computer user client (e.g. each computer user's web browser). As a result of this technology, any shared session participant may operate on cached application response information (e.g., the shared page returned from the application) as if that participant were the controller of the session. Since session identification information (for both the shared session and each participant) is maintained within the collaboration adapter of the invention, there is no need to copy and provide such information such as cookies to each participant's browser. This is important because the invention is thus transparent to the application developer, making application development much easier.

The system of the invention also allows the modification of application response information based on a real identity of the participant. For example, a shared session can be associated or "owned" by a participant of the shared session. As such, the owner of the shared session may be able to uniquely control the application state of the shared session while all other participants may, for example, only be able to read the contents of the shared session and not control the shared session.

Other features of the invention include the removal, alteration, or the addition of information or content into the application response information based on the identity of the participant requesting the information. For example, if an agent of an institution is collaborating with a computer user and each is a member of a shared session, the application response information presented to the agent may be void of any advertising information for instance, while the same application response information provided to the computer user/customer may contain institutional advertising information. In one particular embodiment, multiple versions of application response information can be stored such that each version is associated with a different respective identity of a shared session participant.

More specifically, the present invention provides systems, methods and computer system arrangements for providing participant access to an application via a shared session.

One method embodiment that accomplishes this task comprises the steps of receiving a first request from a first participant via a first participant session to access the application via a shared session. The first participant can be, for example, a computer user on the Internet using a web browser to access a web server via the first session, which may be an HTTP user session. After receiving the first request, the method substitutes participant session identification information identifying the first participant session within the first request with shared session identification information identifying the shared session to create an altered request. In other words, the invention removes the identity of the requesting participant along with, for example, any access control information, HTTP input buffer information, or the like from the original (i.e., the first) request and replaces this information with similar information obtained from a cache of shared session information. The invention initially establishes shared session identification information (e.g., shared session state information), as will be explained, upon creation of the shared session.

Generally, the shared session identification information contains participant information for an owner of the shared session, who is typically the creator of the shared session unless shared session ownership is transferred. Once the method substitutes this information into the first request to create the altered request, the method forwards the altered request to the application such that the application operates to produce application response information in accordance with shared session identification information contained in the altered request, independently of participant session identification information contained in the first request.

According to another embodiment, the method receives application response information from the application in response to operating on the altered request. It is important to note that the application produces the application response information under the impression that the participant associated with the shared session identity information is the participant who generated the altered request, when in fact this may not actually be the case (i.e., any one of many participants may have sent the request). The method then caches the application response information in a cache of application response information and forwards the application response information to the first participant via the first participant session to allow the first participant to access the application via the shared session. This method can be performed for many participants, such that the application server can be controlled, guided, etc. via the single shared session using the single owner participant identity, even though many different participants are actually submitting the requests to control progression of the shared session.

In another embodiment, the step of forwarding includes the steps of determining if the first participant is the owner of the shared session, and if so, including any application specific cookie information within the application response information forwarded to the first participant, and if not, excluding any application specific cookie information within the application response information forwarded to the first participant. As such, the owner participant of a shared session maintains proper cookie state with respect to the application server 50.

In another embodiment, the method further includes the steps of identifying a second request received from a second participant via a second participant session as a request to join the shared session to access the application. The second request may be, for example, a request for the same application response information as was made by the first request for the first participant. The method then associates the second participant session to the shared session (thus joins this participant to the shared session) and forwards the application response information that is received in response to the altered request to the second participant via the second participant session such that the application does not need to process the second request.

In another embodiment, the step of associating a session of the participant providing second request includes the step of generating shared session participant identification information for the second participant. This allows the second participant to join the shared session. Also, the step of forwarding the application response information that is received in response to the altered request to the second participant includes the step of providing the shared session participant identification information generated for the second participant to the second participant along with the application response information.

In other embodiments, when creating the shared session, the invention includes steps of identifying the first request from the first participant as a request to create a shared session and generating shared session identification information that uniquely identifies the shared session. Then the method performs the steps of associating the first participant session to the shared session and generating shared session participant information for the first participant. The shared session participant information for the first participant uniquely identifies the first participant as a participant in the shared session. The method continues by providing the shared session participant information to the first participant via the first participant session. The browser of the second participant can then thereafter identity itself as a member of the shared session.

In yet another embodiment, the step of generating shared session identification information that uniquely identifies the shared session generates the shared session identification information based on the first request from the first participant which causes the first participant to be the owner of the shared session. Moreover, in such embodiments, the shared session identification information includes at least one of participant identification information associated with the first participant, a name associated with the shared session, access control information associated with the first participant that is required to access the application, communications response buffer information associated with the first participant session and/or a network address associated with the first participant session. This information can be used to allow altered request to appear to the application as being made on behalf of the identity of the participant who is the owner of the shared session.

According to other method embodiments of the invention, a method is included for providing multiple participant access to an application via a shared session. The method includes the steps of receiving a first request from a first participant via a first participant session to access the application via the shared session and determining if application response information specified in the first request is present in a cache of application response information. If so, the method forwards the application response information specified in the first request from the cache to the first participant via the first participant session such that the request does not have to be processed by the application via the shared session. If the application response information specified in the first request is not present in a cache however, the method substitutes participant session identification information identifying the first participant session within the first request with shared session identification information identifying the shared session to create an altered request. The altered request appears to be made on behalf of the shared session participant owner, who may be different than the participant actually submitting the first request. The method then forwards the altered request to the application such that the application operates to produce application response information in accordance with shared session identification information contained in the altered request, independently of participant session identification information contained in the first request.

In other embodiments, the method includes receiving application response information from the application in response to the application operating on the altered request and the method caches the application response information in the cache of application response information. The method then forwards the application response information received in response to the application operating on the altered request to the first participant via the second participant session to allow the first participant to access the application via the shared session. In this manner, the altered request based on the first request can be made based on the identity of the participant owning the shared session, instead of the participant making the first request (though in same cases these may be the same participant, while in others they may be different).

According to other embodiments, the method receives a second request from a second participant via a second participant session to access application response information received in response to the application operating on the altered request. In other words, a second request for the same information (e.g., a web page) obtained via the first request may be received. In response to receiving the second request, the method forwards the application response information cached in response to the application operating on the altered request to the second participant via the second participant session to allow the second participant to access the application response information via the shared session without requiring the application to operate on the second request. This avoids the application having to process redundant operations for the same transactional information.

In other embodiments, the formerly recited steps of forwarding the application response information include the step of determining if a participant requesting the application response information is the owner of the shared session, and if so, including application specific cookie information within the application response information before forwarding the application response information, and if not, excluding application specific cookie information within the application response information before forwarding the application response information. In this manner, the owner of the shared session (generally, the creator unless ownership is transferred, as will be explained) maintains proper cookie state with the application or application server.

In yet other embodiments, the steps of forwarding the application response information include the step of determining an identity of a participant requesting the application response information and altering content of the application response information based on the identity of the participant requesting the application response information and then forwarding the application response information to the participant requesting the application response information. In this manner, the invention can determine who is requesting a web page, for example, and can alter the contents of the web page within the shared session for that requesting participant, while other participants might received differently altered pages. The identity (e.g., a cookie) of a participant can be used to determine who the participant is and thus can be used to select from various content alterations.

In other embodiments, if the second request (i.e., another request for the same page as a formerly received first request) is received before completion of the step of receiving application response information from the application in response to the application operating on the altered request, the method performs the steps of forwarding a predefined response to the second participant via the second participant session indicating that the application response information requested is not yet available. In this manner, participants are not left waiting without an indication of how the shared session is operating. The method then can defer processing of the step of forwarding the application response information in response to receiving the second request until the application has operated on the altered request to produce the application response information requested in the first and second requests. In other words, when the first request causes the altered request via the shared session to finally return the requested information, the second request can be queued up and serviced when the requested information becomes available, and the second request does not need to be serviced by the application.

In another embodiment, the step of forwarding includes the step of determining a participant identity of a first participant requesting the application response information and including the identity of the first participant in the altered request in addition to shared session identification information to allow the application to conditionally operate on the altered request based on the identity of the participant, independently of shared session identification information contained in the altered request. In this manner, the application can be accessed on behalf of the shared session, but can also obtain the identity of the actual participant requester. Thus if the application desires to do some additional or conditional processing based on the true identity of the participant requesting access via the shared session, independently of the identity of the shared session owner participant, the application may do so. The application thus can, for instance, alter content of application response information, limit access to transactional data or functions, and so forth.

Other embodiment include the steps of deciding if the first participant is allowed to access the application via the shared session by consulting an access control list associated with the shared session, and if so, allowing access to the shared session by the first participant as specified in the access control list, and if not, rejecting access to the shared session by the first participant. In this manner, the invention provides security to shared sessions. The access control list (ACL) may define what operations (e.g., read only, read, view but not submit or perform HTTP posts, etc.) a participant can request of an application via the shared session.

In still other embodiments, the shared session may be a restricted shared session and the method may include the step of detecting if the first request is a request by the owner of the shared session to terminate the shared session, and if so, terminating sessions of all participants to the shared session. Thus if a shared session is restricted and the owner decides to leave the shared session, all other participants are forced to leave as well.

In other embodiments, the method includes the steps of receiving a subsequent request from a participant to the shared session to access the application response information requested in the first request and determining if the application response information is available without forwarding an altered request to the application, and if so, forwarding the application response information to the participant to the shared session originating the subsequent request. This avoids the application having to process redundant requests for the same information.

In other embodiments, the step of receiving a first request includes the steps of detecting a transfer shared session ownership command within the first request and authenticating that the first participant is authorized to transfer ownership of the shared session. If so, the method substitutes a shared session participant identity defined within the shared session identification information with shared session participant identification associated with the first participant, such that the first participant becomes the owner of the shared session. This allows a participant (preferably the owner or other privileged user) to transfer shared session ownership.

In still other embodiments, the shared session identification information is distributed and accessible by multiple web servers. This allows an e-commerce web site that employs the system of the invention to be distributed, for example, behind a load balancer.

Other embodiments of the invention includes computer system arrangements providing participant access to an application. According to one such embodiment, the computer system arrangement includes an input/output interface, at least one memory system, and a processor coupled to the input/output interface and the memory system. The memory system (there may be more than one) is encoded with an application and a web server process including a collaboration adapter that, when performed on the processor, causes the computer system arrangement to perform the operations of receiving, over the input/output interface, a first request from a first participant via a first participant session to access the application via a shared session between the web server and the application. When further performed, the collaboration adapter process substitutes, in the memory system, participant session identification information identifying the first participant session within the first request with shared session identification information identifying the shared session to create an altered request and forwards the altered request to the application such that the application operates to produce application response information in accordance with shared session identification information contained in the altered request, independently of participant session identification information contained in the first request.

Other embodiments of computer system arrangements are also provided that perform all of the method steps in the method embodiments discussed above and elsewhere herein. For example, a web site configured to operate in accordance with any other the methods disclosed herein is considered to be an computer system arrangement or apparatus within the scope of this invention. It is also to be understood that the invention may be employed and/or integrated into an application server, a web server, or both. Alternatively, the collaboration adapter may operate as a plug-in software module, dynamically linked library, or other modular addition to existing web and application server platforms.

Embodiments of the invention also include computer program products such as disks, or other readable media that have a computer-readable medium including computer program logic encoded thereon for operating in a computerized device, such that the computer program logic, when executed on at least one processing unit with the computerized device, causes the at least one processing unit to perform any and/or all of the aforementioned methods embodiments.

The methods and arrangements of the invention are preferably implemented primarily by computer software and hardware mechanisms within a web site server and/or application server system. The computer program logic embodiments, which are essentially software, when executed on at least one processing unit with the data communications device, causes the at least one processing unit to perform the method techniques outlined above, as well as all operations discussed herein that can be performed by software program(s) executing on computer hardware. In other words, these arrangements of the invention are generally manufactured as a computer program(s) stored on a disk, memory, card, or within a prepackaged operating system, web server application, or other such media that can be loaded into a computer system, server or other data communications device to make the device perform according to the operations of the invention.

The features of the invention, as summarized above, may be employed in data communications devices, web or application server software, and/or other computerized devices and/or software systems such as those manufactured by Cisco Systems, Inc. of San Jose, Calif., the assignee of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

General Architecture and Example Operation

Figure 1:
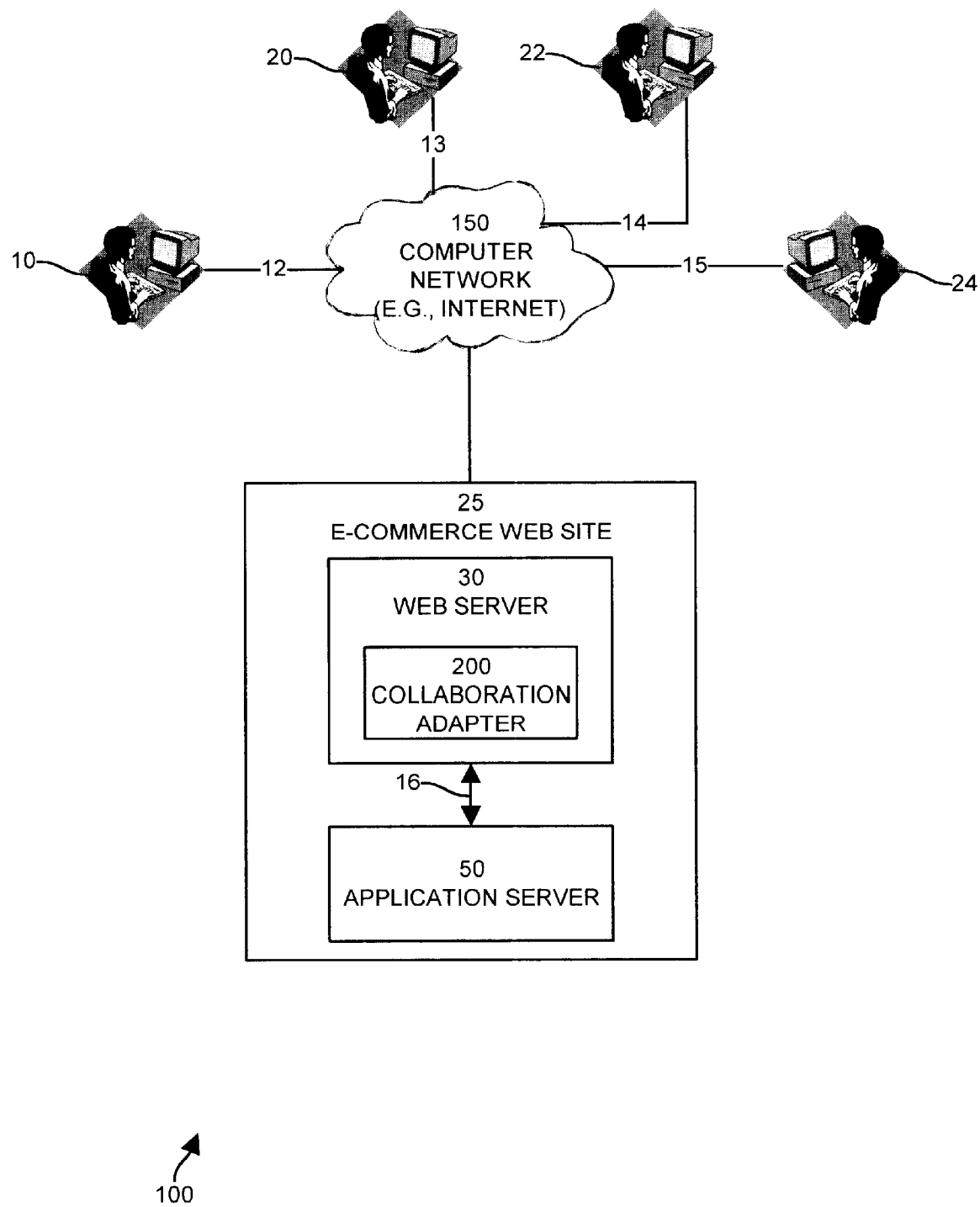
FIG. 1 illustrates an example networked computing environment including an e-commerce web site equipped with a collaboration adapter configured in accordance with one embodiment of the invention.

FIG. 1 illustrates an example computer system environment 100 which supports collaboration in accordance with the system of the invention. As illustrated, an e-commerce web site 25 includes a web server 30 and an application server 50. The web server 30 is equipped with a collaboration adapter 200 configured according to embodiments of the invention. Computer users using Internet browsers, referred to herein as participants 10, 20, 22 and 24, interconnect to a computer network 150 such as the Internet to communicate with the e-commerce web site 25 using user respective user HTTP sessions 12 through 15. The collaboration adapter 200 of this invention within the web server 30 allows each of the participant computer users 10 through 24 to collaboratively interact together with a single shared session 16 when accessing an application served by the application server 50 via the web server 30.

An example of such collaboration in accordance with the system of invention will be provided next in relation to FIG.

Figure 2:
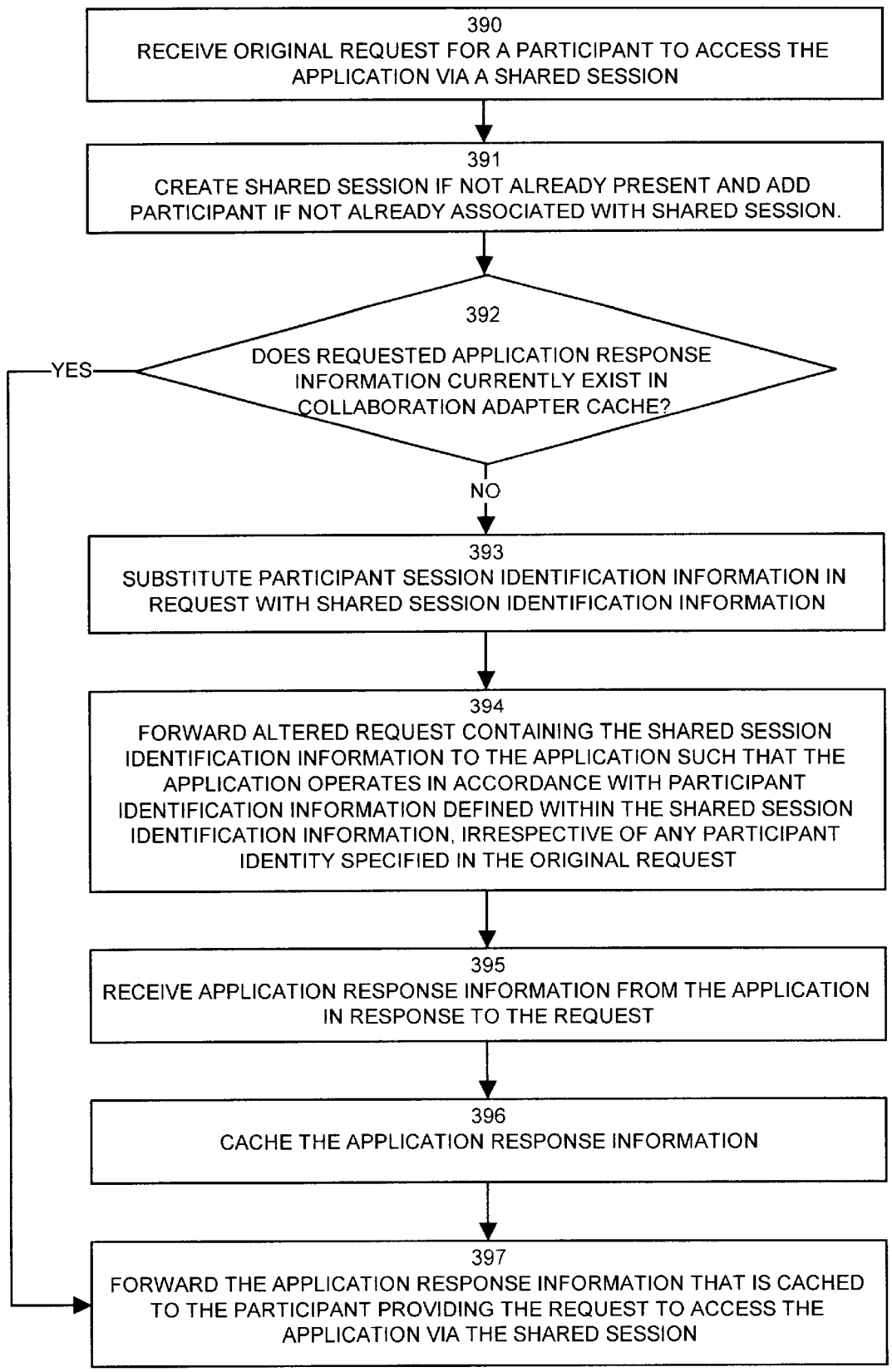
FIG. 2 illustrates a flow chart of the high level processing steps performed according to embodiments of the invention.

1 and the high level flow chart of processing steps of the invention shown in FIG. 2. A more detailed discussion including flow charts of specific operations of various arrangements and components of the invention will be presented thereafter.

In FIG. 1, assume that user browsers 10, 20, 22 and 24 independently access the web server 30 initially, but that they collectively at some point need to view the same dynamic, personalized, secure and transactional-based web pages in order to work together synchronously. Using the system of the invention, along with any HTTP request, participant 10 (by way of example only) can initiate collaboration by requesting the creation of a named HTTP shared session 16 to be created to the application server 50 served by the web server 30.

In step 390, the web server 30 receives the original HTTP request via session 12 and passes it to the collaboration adapter 200.

In step 391, if not already present, the collaboration adapter 200 creates an HTTP shared session 16 between the web server 30 and the application server 50, and adds participant 10 as a participant to this shared session. The creation process for a shared session and the addition of participant to a shared session are discussed in more detail with respect to FIGS. 4 and 5.

Generally however, and as will be explained more fully later, the shared session 16 has a name and is linked to the HTTP session 12 of the participant that requested its creation. To create a shared session, the collaboration adapter 200 generates a unique shared session ID and stores this, along with HTTP session and header information associated with the participant 10's HTTP session 12 (i.e., the user session that originated the request to create the shared session 16). Shared session identification information (not specifically shown in this Figure) may include an IP address of participant 10's computer, one or more browser supplied cookies that may be required to access the application server 50 on behalf of participant 10, participant 10's application username, application password, and other information. Shared session identification information essentially contains any information necessary for a participant to use the shared session 16 to properly interact with the application server 50 under the identity of one participant to the shared session. This participant is generally the creator of the shared session 16 (participant 10 in this example) is considered the owner of the shared session 16

Also as will be explained further, for each participant added to the shared session (including the owner participant), the collaboration adapter 200 generates a unique shared session participant ID (not specifically shown) and returns this along with the shared session ID to the requesting participant. It is to be understood that this is not meant to be limiting of the invention. In alternative embodiments, each participant may receive only the shared session participant ID without receiving the shared session ID. In such an embodiment, the collaboration adapter might maintain a mapping of which participants are involved in a particular shared session.

In step 392, the collaboration adapter 200 examines the request for access to the application server 50 (i.e., the request from participant 10 in this example) to determine if the requested application response information (e.g., a requested web page) currently exists in a cache of application response information (not shown here) within the collaboration adapter 200. Such application response information might already exist if the shared session 16 were already in existence when the participant sent the request received in step 390, and if this is the case, the collaboration adapter 200 processes step 397 (explained below). However, in this case, since this is an initial request for this application response information, the application response information does not yet exist and so the collaboration adapter proceeds to process step 393.

In step 393, the collaboration adapter 200 substitutes, within the initial request, participant session identification information with shared session identification information (i.e., with participant owner information). As will be explained more completely later, the collaboration adapter 200 in step 393 alters the context of an HTTP session state associated with the HTTP session 12 (for participant 10) and substitutes a new HTTP response buffer for the original one contained in the original request for shared access to the application server 50. Thereafter, normal HTTP request processing continues, although the context of the original request has been altered by the collaboration adapter 200.

In step 394, the collaboration adapter 200 then returns control to the web server 30 and the web server 30 forwards the request (the altered request) containing the shared session identification information to the application server 50 which operates in accordance with participant identification information defined within the shared session identification information, irrespective of any participant identity specified in the original request (received in step 390). At this point, the application server 50 is unaware of any differences in handling the HTTP request using a participant identity associated with the shared session 16 and simply executes program logic and returns, for example, a web page (not specifically shown) containing application response information to the web server 30.

In step 395, the web server 30 receives and forwards the application response information (e.g., the returned web page) back to the collaboration adapter 200.

In step 396, the collaboration adapter caches the application response information so that a copy of the result page can be saved for other participant requesters. Also in step 395, the collaboration adapter 200 saves, within the shared session identification information, any additional application specific cookies generated by the application server 50 that are associated with the shared session 16.

In step 397, the collaboration adapter 200 then allows the web server 30 to forward the requested application response information (i.e., as a web page) that is cached back to the participant 10 providing the original request to access the application server 50 via the shared session 16. In this example, since participant 10 created the shared session 16 and is thus the owner of the shared session 16, step 396 in this embodiment also forwards any application specific cookies to the browser of participant 10. However, other participants requesting the same page do not receive application specific cookies in this manner, as will be explained further. In an alternative configuration, application specific cookies are not distributed to any participant browsers.

Now the server is prepared to add other participants to the shared session 16. Suppose participant 20 desires to join and collaborate with participant 10 using the shared session 16. The processing of FIG. 2 is generally repeated for such a procedure.

More specifically, the participant 20 via user session 13 forwards an HTTP join-shared-session request (not specifically shown) containing the name of the shared session 16 to the web server 30. The web server 30, in step 390, receives and forwards this subsequent or second request to the collaboration adapter 200. Since the shared session 16 already exists, the collaboration adapter 200 does not create a new shared session in step 391, but rather finds the shared session 16 by name and since this is a new participant to the shared session 16, associates the new HTTP participant session 13 for participant 20 to the shared session 16 in step 391. Just as for participant 10, the collaboration adapter 200 in step 391 also generates a shared session-participant ID for participant 20.

The collaboration adapter 200 then determines in step 392 if the requested application response information is present in the collaboration adapter 200. Assume for this example that the requested information is present and so processing proceeds to step 397 where the collaboration adapter 200 forwards a copy of previously obtained application response information obtained from the application server 50 for the original request from participant 10) cached for the shared session 16 to the web server 30 which returns this page to the new shared session participant 20. Along with the application response information, the collaboration adapter (via the web server 30) includes the unique shared session ID for shared session 16 as well as the shared session participant ID generated for the new participant 20, uniquely identifying this participant as being part of the shared session 16. Since participant 20 is not the owner of the shared session 16, any previous application specific cookies generated by the application server 50 within the resulting page are not forwarded to the browser of participant 20.

At this point, the browsers of both participants 10 and 20 have identical HTML contents and both participants 10 and 20 have a shared session cookie identifying them as participants in the shared session 16. However, the browser of each participant 10, 20 maintains a unique participant HTTP session 12, 13 with the web server 30 and each participant 10, 20 maintains unique cookie state with respect to the application server 50. For example, each participant browser contains a cookie for both the shared session ID and the participant session ID in one embodiment. Such a feature may be useful in embodiments introduced later in which the application itself can be made aware of which participant is requesting access to the application. Furthermore, each participant's browser is identified to the collaboration adapter 200 by the unique shared session participant ID (e.g., a unique participant cookie).

From this point on, either participant 10, 20 is allowed to operate on the current result page containing application response information (e.g., either participant can submit a request based on the page, select a link on the page, complete a CGI-script-based form in the current page, etc.). In other words, in the most general embodiment, any participant can control the shared session 16 to obtained the next page of the session via the processing steps in FIG. 2. When this happens, the other participant(s) to the shared session 16 will be able to obtain the next resulting page in response to those other participant's subsequent requests to the web server 30. The web server 30 does not need to return to the application server 50 to process redundant requests, since the requested page has already been retrieved (under the identity of the shared session participant owner) in response to a first request for the page and is thereafter cached by the collaboration adapter 200.

By way of example, assume that participant 20 completes and submits a form based on the current web page of application response information to the web server 30. This causes the web server 30 to receive a new request (step 390) for processing by the application server 50. The web server 30 receives the request (e.g., via an HTTP POST) from the participant 20 which contains distinct application cookies that are inconsistent with those in browser of participant 10 (the owner identity associated with the shared session 16). However, the request from participant 20 includes shared session and shared-session-participant IDs (e.g., cookies) identifying participant 20 as a participant in the shared session 16. As such, before any normal HTTP processing, the web server 30 forwards the request (e.g., the HTTP-POST operation) to the collaboration adapter 200.

The collaboration adapter 200 receives the request information (step 393) and finds the identified shared session 16 (e.g., by its name, cookie, or other identity), authenticates the HTTP session 13 as being a valid participant in the shared session 16, and validates the request. In this embodiment, the collaboration adapter ignores any application cookies within the original request from participant 20. Instead, the collaboration adapter 200 retrieves shared session identity information (not shown in this Figure, but maintained within the collaboration adapter 200) associated with the owner (e.g., participant 10) of the shared session 16 and substitutes or overwrites (step 393) the original HTTP session state of the request with cached session state (shared session identification information) associated with the shared session 16 (i.e., session state associated with owner participant 10 and shared session 16). Essentially, the collaboration adapter 200 causes the web server 30 to construct an altered request under the identity of the shared session 16, instead of the participant session 13. It is to be understood that the specific information passed between requests received from participants through the collaboration adapter to the application may be configurable such that unique participant identity and/or other information (cookie) may or may not be provided to the application.

The collaboration adapter 200 then returns control to the web server 30 (step 394) and request processing continues, although all subsequent interaction with the application server 50 using the altered request appears to be on behalf of the shared session 16 (i.e., participant 10), even though the operation was posted by participant 20.

The application server 50 processes the request and forwards the next resulting page to the web server 30 and the collaboration adapter 200 caches the resulting page (step 395). In some embodiments, the resulting page replaces the previous shared page, whereas other embodiments keep a cache of multiple previous pages (e.g., as a series of progressive pages representing sequential transactions performed under the identity of the shared session 16). Any additional cookies generated by the application server 50 similarly become part of the shared session identification information cached within the collaboration adapter 200.

Once the collaboration adapter 200 receives and caches the resulting page (step 395), the page is returned to the participant 20 (step 397) who initiated the original request. Any new cookies generated by the application server 50 are only relevant for participant 10 (since the shared session 16 operates using the identity of participant 10) are thus, in this embodiment, not returned to the browser of participant 20 however, since participant 20 is not the owner of the shared session 16. As such, any application cookies that might be present in the browser of participant 20 have not changed since participant 20 joined the shared session 16. However, as noted above, an embodiment in which such information is provided to the participant may operate as such so that each participant browser contains cookie state information relevant to the shared session.

Continuing with the example, next, participant 10 needs to get the shared result page that the application server 50 generates based on the former request for the next page that has already been processed by the web server 30 for participant 20. Participant 10 becomes aware of the new or next page using mechanisms discussed in detail later. Once the participant 10 is aware of the new page in the shared session 16, the participant 10 requests the current page via session 12 to the web server 30 (step 390). Because the request is accompanied by the shared session and shared session-participant cookies, the web server 30 forwards the request to the collaboration adapter 200 and step 391 can be skipped completely by the collaboration adapter 200 (since the shared session exists and participant 10 is already a member).

The collaboration adapter 200 identifies the shared session 16 based on the request as noted above, and in step 392 determines the request page is already available without having to access the application server 50. As such, the collaboration adapter 200 fetches the copy of the previous result page of application response information from the page cache (not shown in FIG. 1) and returns it to the browser of participant 10 (step 397). Any new cookies generated by the application server 50 in this case are returned to the browser of participant 10 because the collaboration adapter 200 is aware of which HTTP session (session 12 associated with participant 10) owns the shared session 16.

In a conventional implementation of an example e-commerce web site 25 (i.e., without the collaboration adapter 200 of this invention), each computer user interacts through a web server with an application server using separate user sessions that extend all the way to the application server. The web server and the application server are each aware of, and maintain separate state information for each separate user session. All transactions performed by computer users are passed between the web server to the application server for application processing, including those transactions which are redundant or identical from one user to the next. Furthermore, a conventional application server passes user session identification information, such as application specific cookies, to the web server for distribution to each computer user (i.e., to each computer user's browser).

Essentially, a conventional multi-user application server system must maintain separate logical communications channels that handle respective user requests and application responses for each user and must also maintain, for example, private stack data for each user along the entire path of communications and processing extending from an application server, through a web server, to each user computer system.

Conversely, the collaboration adapter 200 integrated into the web server 30 in this invention facilitates such capabilities as explained in the examples above.

As will also be explained, other embodiments provide a filtering mechanism (not shown in FIG. 1) that allows the collaboration adapter 200 to be able to distinguish between participants to a shared session (e.g., based on identities) in order to alter the application response information served as a copied web page to each shared participant based on a role or identity distinction made between the participants to the shared session. The filter mechanism may operate independently of the application server 50 such that the application server 50 only needs to process a request or transaction once using the identity of the shared session 16. The filtering mechanism can then alter the application response information on a participant by participant basis without disturbing or burdening the application server 50.

Also using the system of the invention, collaboration between multiple participants 10 through 24 to a shared session 16 can begin at anytime in a regular HTTP session. That is, the participant 10 can establish an individual session 12 with the application server 50 and then at a later time can convert the individual session into a shared session 16 to allow the participants 20 through 24 to concurrently interact with the same shared session 16.

The collaboration adapter 200 of the invention handles, among other tasks, the management of the shared session 16 between the web server 30 and the application server 50. In certain embodiments, the application server 50 is completely unaware that there are multiple participants to the shared session and is thus only aware of a single user identity controlling the shared session 16. This allows collaboration to occur without any changes being required in application logic within the application server 50.

The web server 30 configured according to the invention serves copies of pages containing the application response information that, in most embodiments, are identical to those produced by an application server 50 operating in a conventional non-collaborative environment. That is, copies of web pages within the shared session 16 are served to shared session participants 10 through 24 and these pages include live hypertext links and active buttons directing all of the browsers of the shared session participants back to be original web server 30, rather than to a proxy server. Since the application server 50 generally is aware of only one user session guiding application transaction processing (i.e. the shared session 16), the application server 50 can operate in a completely conventional manner without any modifications.

The collaboration adapter 200 is also able to selectively pass the identity of certain participants to the application server 50 such that participant-specific processing may be performed by the application server 50 even though there are multiple participants 10 through 24 interacting with the application server 50 using the single shared session 16.

Using the above example, if participant identity passing is enabled, the collaboration adapter 200 can pass the identity of a particular participant 22 along with the shared session identification information (using identity of participant owner 10) to the application server 50 when the participant 20 provides a request to the web server 30. If a software designer designs the application server 50 to be aware of a multi-user collaborative session 16 as provided by the invention, the application server 50 can use participant identities 10 (i.e., the owner but not the requestor) and 20 (the requestor but not the owner) in transaction processing. In these instances, content may be added or removed from a resulting web page such that the web server 30 serves to multiple participants based on who is requesting the page. Depending upon the implementation of the invention, the web server 30 or the application server 50 may handle the addition or removal of content based on participant identity. For example, the adapter could query the application server for participant specific information prior to serving a page back to each participant.

Detailed Example Architecture

Figure 3:
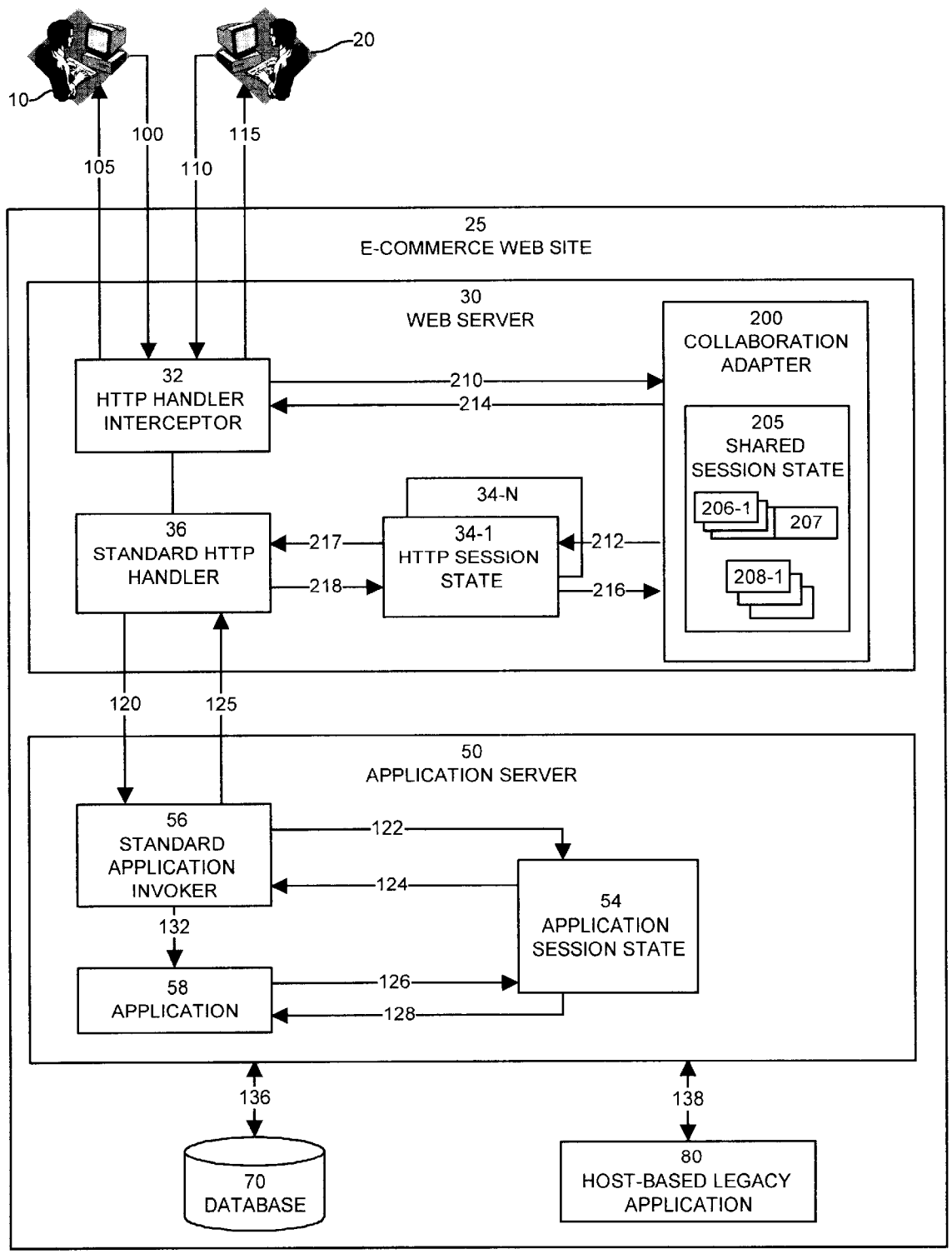
FIG. 3 illustrates a more detailed architecture of the e-commerce web site of FIG. 1 configured in accordance with one embodiment of the invention.

FIG. 3 illustrates a more detailed example architecture of an e-commerce web site 25 configured in accordance with one embodiment of the invention. In FIG. 3, only two participants 10, 20 are illustrated as interacting with the e-commerce web site 25 for ease of description of the invention. It is to be understood that many more participants may participate in a shared session using the system of the invention. Participants in the context of these example descriptions of the invention generally means that a person acting as a computer user interacts with web browser software performing (e.g., executing) within a user computer coupled to a network (e.g. 150 and FIG. 1) that in turn is coupled via a session (e.g., an HTTP user session) to the e-commerce web site 25.

In this example architecture, the web server 30 includes an HTTP handler interceptor 32, a standard HTTP handler 36, one or more copies of HTTP session state 34-1 through 34-N and a collaboration adapter 200 which includes cached shared session state 205. The cached shared session state 205 includes one or more sets of participant session identification information 206-1 (once set for each participant to a shared session) and shared session identification information 207. The application server 50 includes a standard application invoker 56, a copy of application session state 54 and the application 58. The application server 50 also may interact in this example with a database 70 and a host-based legacy application 80.

Detailed Operation: Creating a Shared Session

This description of the operation of the system of the invention will be explained in more detail with reference to the flow charts of processing steps shown in FIGS. 4 and 5, and with reference to the general architecture illustrated in FIG. 3.

In this more detailed example operation of the invention, participant 10 will initiate creation of the shared session and participant 20 will join the shared session thereafter.

When any participant computer user (e.g., 10, 20) initially provides an HTTP request (e.g., 100 or 110), to the web server 30, the HTTP handler interceptor 32 within the web server 30 establishes an HTTP session state 34-1 on behalf of that participant. Generally, the web server 30 maintains an HTTP session state 34 for each participant to buffer HTTP requests (e.g., 100, 110) for web pages on behalf of that participant while those requests are being serviced by the application server 50.

Figure 4:
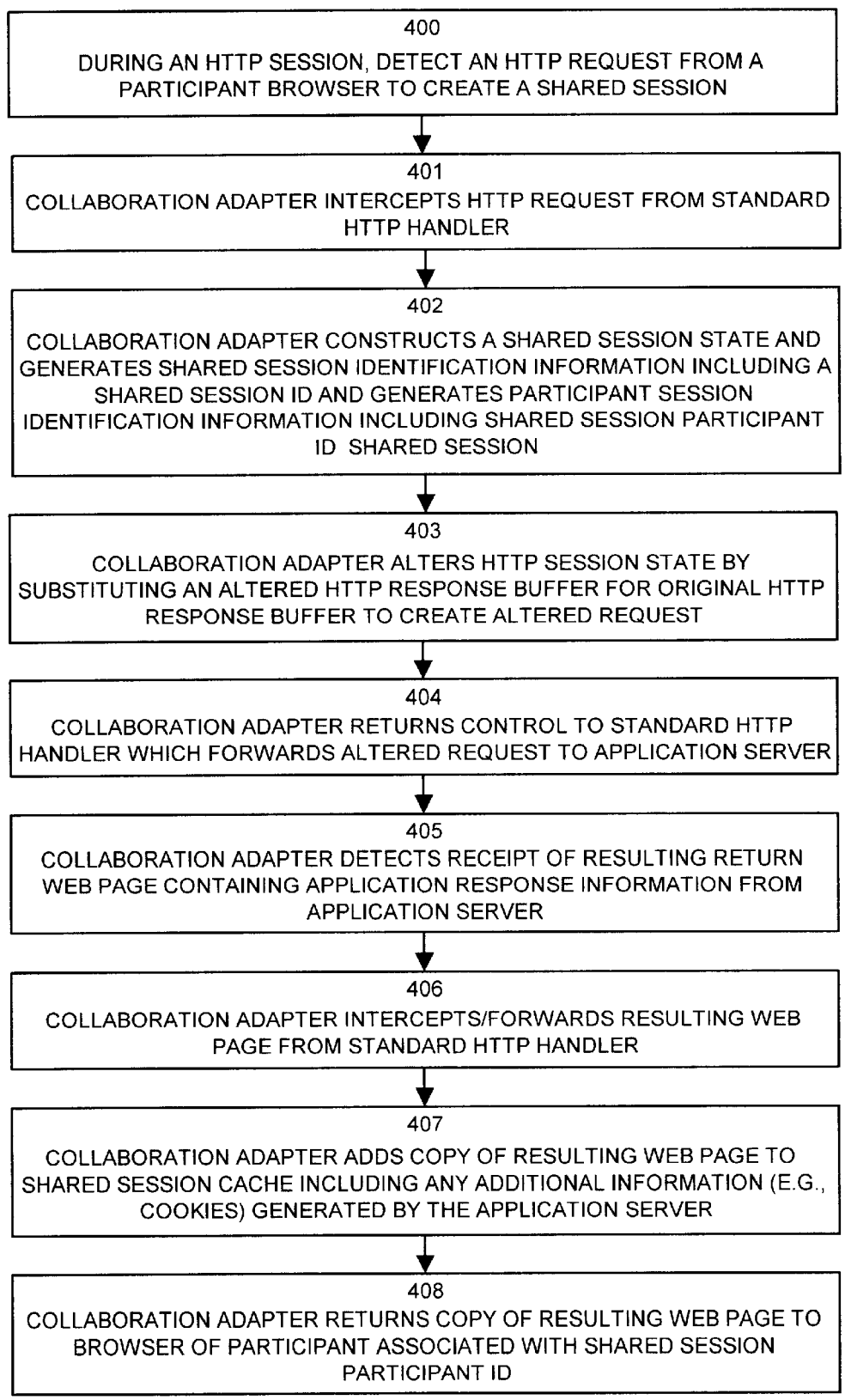
FIG. 4 provides a flow chart of processing steps performed according to embodiments of the invention to create a shared session.

According to this embodiment of the invention, in step 400 in FIG. 4, the participant 10 (via that participant's web browser, for example) sends an HTTP request 100 to the web server 30 that requests the creation of a named HTTP shared session which all participants will use to access to the application server 50. The command to request creation of a shared session may be embedded along with any HTTP request. For the request 100 containing the "create shared session command", in step 401, the HTTP handler interceptor 32 intercepts the request 100 and passes the request information 210 to the collaboration adapter 200.

The collaboration adapter 200 receives the request information 210, and in step 402, constructs a cached shared session state 205 in a memory system (of which there may be more than one, not specifically shown) within the web server 30. Generally, the shared session state 205 stores information concerning the state of the shared session, such as shared session identification information 207, participant session identification information 206-1 through 206-N (one for each participant in the shared session), and one or more buffered pages of application response information 208-1 through 208-N and other information.

Also in step 402, upon creation of a shared session, the collaboration adapter 200 creates shared session identification information 207 which includes a session name as specified in the create shared session request 100, a shared session identity (e.g., a unique shared session number), HTTP header information associated with the participant session that owns the shared session (e.g., the HTTP session header for participant 10, in this example), an IP address of the participant 10, one or more cookies provided from the participant 10 (i.e., from participant 10's browser), a user name and/or password and possibly other information that would be required for participant 10 to access the application server 50. Essentially, the shared session identification information 207 contains all the information necessary for the collaboration adapter 200 to properly create and/or format HTTP requests such that they may be sent to the application server 50 and appear to have originated from, or on behalf of, a single participant computer user who is the owner of the shared session (participant 10, in this example).

In step 402, the collaboration adapter 200 also creates participant session identification information 206-1 within the shared session state 205 for participant 10. When a participant (e.g., 10, 20) creates and/or initially joins an existing shared session, the collaboration adapter 200 creates a set of participant session identification information 206 for that participant. A set of participant session identification information 206 contains a link, reference, pointer or other association to the participant's session state 34 (e.g., 34-1) associated with the participant (e.g., 10) in the shared session, as well as any other identification information required for the web server 30 to format or identify responses (e.g., 105,115, as we explained) provided from the web server 30 to a participant browser as being associated with the participant who originated the request for such a response. In other words, the collaboration adapter 200 can use a set of participant session identification information 206 to properly format application response information provided from the application server 50 via the shared session so as to be properly accepted by a participant browser. Participant session states 34-1 through 34-N may generally be considered information related to individual participant user sessions 12 through 15 in FIG. 1.

For each participant in a shared session, the collaboration adapter 200 in step 402 also creates and assigns a unique shared session participant identity or ID (e.g., a unique number assigned to this participant for this shared session). The collaboration adapter 200 can store the shared session participant identity for a particular participant within that participants set of participant session identification information 206.

At this point in processing, the collaboration adapter 200 has essentially created a shared session (generally considered all information within the shared session state 205) which the collaboration adapter 200 can use to interact with the application server 50 using the identity of the owner of the shared session, which is participant 10 in this example. The collaboration adapter 200 has also added participant 10 as a participant (and owner) to the shared session.

The collaboration adapter 200 can now have the application server 50 service the request 100 provided by participant 10 using the shared session just created. To do so, in step 403 of FIG. 4, the collaboration adapter 200 alters the original contents of the initial HTTP request 100 that resides in the HTTP session state 34-1 by substituting an original HTTP response buffer (not specifically shown) received from the browser of participant 10 within the initial HTTP request 100 with an altered HTTP response buffer (not specifically shown). The altered HTTP response buffer contains shared session identification information 207 that identifies the altered HTTP request 120 (explained below) as being made on behalf of a shared session identity instead of on behalf of a specific individual participant session that originated a request. (For shared session creation, these happen to be the same participant). In other words, the collaboration adapter 200 substitutes participant session identification information within the original HTTP request 100 with shared session identification information 207.

Next, in step 404, the collaboration adapter 200 returns control to the standard HTTP handler 36 which constructs an altered request 120 based on shared session identification information contained in the altered HTTP session state 34-1. The HTTP handler 36 forwards the altered request 120 to the application server 50 such that the application server 50 operates in accordance with participant identification information (i.e., identity of the owner participant) obtained from the shared session identification information 207 in the altered request 120, irrespective of an identity of the participant from which the initial request 100 was received.

Neither the standard HTTP handler 36 nor the application server 50 are aware that the context of the initial HTTP request 100 has been altered by the collaboration adapter 200 to now identify the request as a request being made on behalf of the shared session owner participant identity, instead of any specific participant session having an associated specific participant identity.

For this example, application server processing is not shown in detail in FIG. 4. However, for completeness of this discussion, within the application server 50, the standard application invoker 56 receives the altered request 120 and is unaware of any differences in the altered HTTP request 120 (as opposed to an un-altered HTTP request made directly by a participant not involved with a shared session). As such, the standard application invoker 56 handles the HTTP request 120 as a normal request which appears to have been made on behalf of the shared session, using any cookies, identity, user name and/or password contained in the shared session identification information 207.

In response to receipt of the altered request 120, the standard application invoker 56 creates 122 an application session state 54 for the shared session instance/invocation of the application 58. The standard application invoker 56 then invokes 132 the application 58 which executes program logic to process to request 120. The application session state 54 thus relates an instance of the application 58 (e.g., a process executing as the application 58) to the identity associated with the shared session state (e.g., 205/207). The application 58 may consult 128 the application session state 54 during processing and may supply 126 additional application state information during processing of the request 120. The application 58 may, for example, also interact 136, 138 with a database 70 and/or a host-based legacy application 80 while processing the request 120.

Upon completion of processing of the request 120, the standard application invoker 56 returns application response information 125, for example, as a resulting web page, to the standard HTTP handler 36 within the web server 30. The application response information 125 may contain, for example, application-specific cookies (54 in FIG. 6, discussed later) which are intended to be returned to a participant browser having the identity of the shared session (i.e., the owner browser). In other words, the application server 50 processes the altered HTTP request. 120 on behalf of the shared session as if the shared session were under control of a single shared session participant having the identity of the shared session owner.

The HTTP handler 36 then forwards 216 the application response information 125 into the HTTP session state 34-1 at which point the collaboration adapter 200, via 216 and steps 405 and 406 in FIG. 4, detects receipt of the resulting application response information 125 from the application server 50 and intercepts and forwards the application response information 125 from the standard HTTP handler 36 to the collaboration adapter 200.

Next, in step 407, the collaboration adapter 200 adds a copy of the application response information 125 to the cached shared session state 205. The application response information 125 may be in the form of a web page, for example. Any additional cookies generated by the application 58 within the application server 50 that are returned in the application response information 125 are also added to the shared session state 205 The collaboration adapter 200 can place the application response information and/or any application cookie information contained therein, for example, within the shared session identification information 207.

An example of a copy server system that can maintain copies of web pages on behalf of multiple participants to a shared collaboration session is described in detail in co-pending U.S. patent application Ser. No. 09/347,870, filed Jul. 6, 1999, entitled "Copy Server for Collaboration and Electronic Commerce," which is assigned to the same assignee as the present invention. The entire disclosure, teachings and contents of reference U.S. patent application Ser. No. 09/347,870 are hereby incorporated by reference herein in their entirety. Such a copy server system can provide the functionality of this invention that serves copied pages of application response information to participants of the shared session as explained therein. This reference patent application also provides information on maintaining cookie state between participant browsers and the copy server.

Now that the initial request 100 has been processed by the application server 50, the web server 30 is able to provide the results to participant(s) to the shared session. In step 408, the collaboration adapter 200 causes (via 214) the HTTP handler interceptor 32 to return a copy 214 of the application response information 125 as a resulting web page 105 to the participant 10 that originated the HTTP request 100. Along with the resulting web page 105 containing a copy of the application response information 125, in step 408, the collaboration adapter 200 also returns any application cookies provided by the application server 50 within the application response information 125, since the requesting participant 10 happens to be the owner/creator of the shared session. The collaboration adapter 200 also return a copy of the unique shared session identity/ID and a copy of the shared session participant identity/ID, which were each generated by the collaboration adapter in step 402 during creation of the shared session and addition of participant 10 to the shared session.

In one embodiment, the shared session identity/ID and shared session participant identity/ID may be cookies that the collaboration adapter 200 places into the application response information 125 (in step 407) such that when the HTTP handler interceptor 32 returns the application response information 125 to the participant browser (for participant 10 in this example), the participant 10 can now identify itself as a participant to the shared session and can identify the shared session (e.g., 205) to which it is a participant in future or subsequent requests.

At this point in processing, the participant 10 has established a one-participant shared session in the web server 30 to interact with the application server 50. The participant 10 may be considered, for purposes of this example, to be the owner or controller of the shared session. The web server 30 can subsequently add more participants to the shared session.

Detailed Operation: Adding Participant(s) to Shared Session

Figure 5:
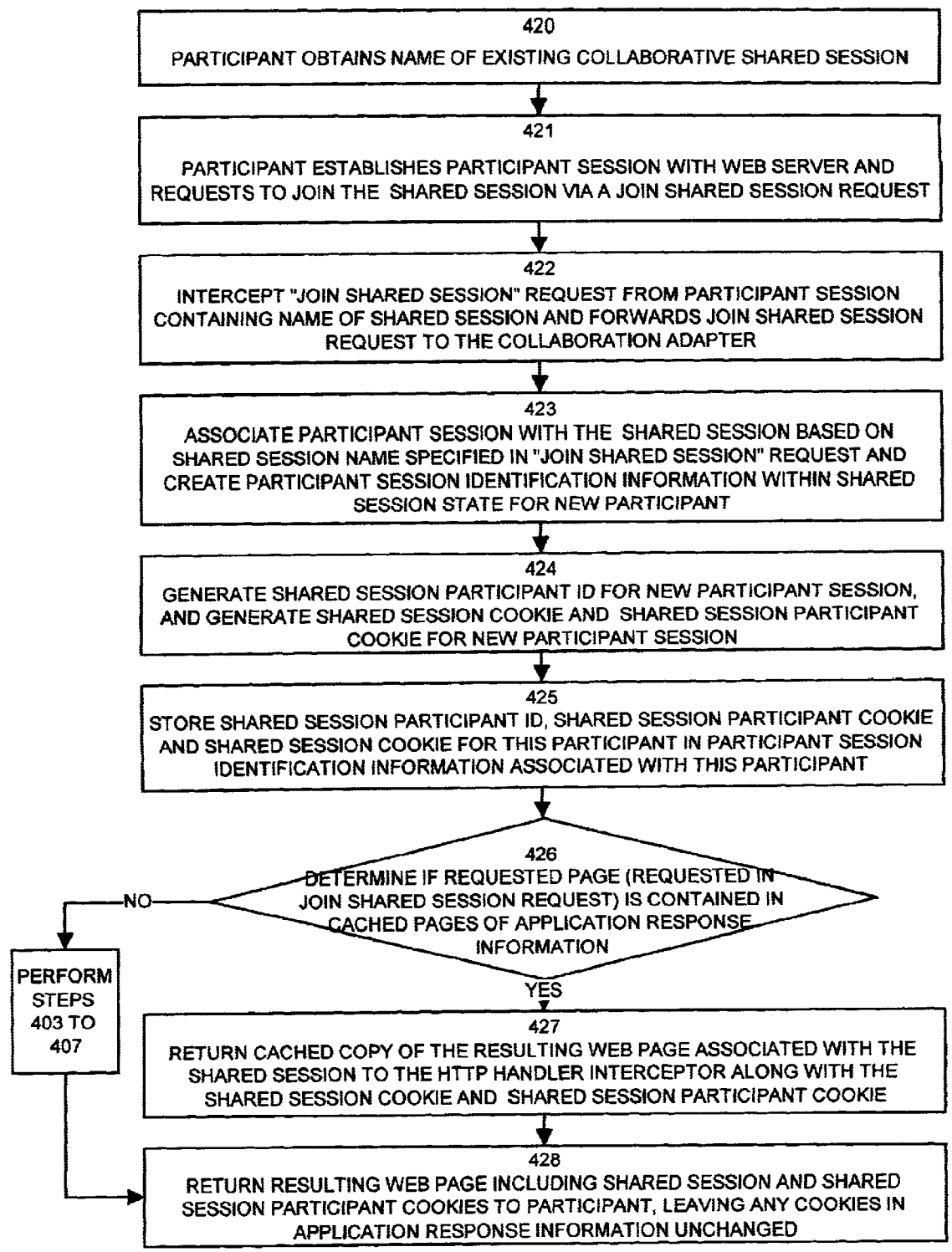
FIG. 5 provides a flow chart of processing steps performed according to embodiments of the invention to allow multiple participants to join a shared session to access an application.

FIG. 5 shows an example of the processing steps performed by embodiments of the invention to add other participant(s) to an existing shared session and to process requests from those other participants. In this example, participant 20 will be added to the shared session. As was done for FIG. 4, the description of the processing steps shown in FIG. 5 will be provided with reference to the example system architecture illustrated in FIG. 3

In step 420, the participant 20 obtains the name of the existing collaborative shared session (the existing shared session created by participant 10) over the telephone, via chat, collaboration, email, a callback, or through some other means. There may be one or more participants currently collaborating using the shared session, though in this example, participant 10 is the only participant in the shared session.

In step 421, the participant 20 (via his or her user browser) establishes a user session (e.g., an HTTP session) with the web server 30 and sends a request 110 to join the shared session, for example, by specifying the name of the shared session within a "join shared session" command contained in an HTTP request 110. As explained above with respect to participant 10, creation of a participant session with the web server 30 involves the HTTP handler interceptor 32 creating another HTTP session state (e.g., 34-2, not specifically numbered) for the HTTP user session (e.g., 13 in FIG. 1) associated with participant 20.

In step 422, the HTTP handler interceptor 32 intercepts the HTTP join-shared-session request 110 from participant 20 and forwards the request 110 (e.g., via the path 210) to the collaboration adapter 200.

In step 423, the collaboration adapter 200 associates (e.g., creates a reference to) the HTTP participant session state 34-2 within the shared session state 205 based on the shared session name specified in the HTTP join request 110 received from participant 20. Much like step 402 as explained above, step 423 also causes the collaboration adapter 200 to create participant session identification information 206-2 which uniquely identifies the participant session (e.g., session 13 in FIG. 1) having HTTP session state 34-2 (and hence the participant 20) as being a member of the shared session. The shared session state 205 now contains a reference via the participant session identification information sets 206-1 (for participant 10) and 206-2 (for participant 20) for each participant taking part in the shared session.

Next, in step 424, the collaboration adapter 200 generates a shared session participant identification number for the new HTTP participant session (state 34-2) for participant 20 and generates a shared session cookie/ID and a shared session participant cookie/ID to be assigned to the new participant session for participant 20. The shared session participant identification number, as explained above in step 402, identifies participant 20 as a member of the shared session. The shared session and shared session participant cookies respectively identify the identity of the shared session and a unique identity for the shared session participant (participant 20 in this example) and, as will be explained, will be returned to the participant 20 for future identification of subsequent requests 110 made to the web server 30 from participant 20.

In step 425, the collaboration adapter 200 stores the shared session participant identification number, the shared session participant cookie and the shared session cookie for this participant (participant 20) within the participant session identification information 206-2.

Aside from containing a request to join the shared session, the HTTP request 110 from participant 20 also specifies a request (e.g., a URL) to retrieve some application response information from the application server 50. Since the collaboration adapter 200 caches pages of application response information 125 as shown by pages 208-1 through to 208-N, the collaboration adapter 200 can determine, in step 426, if the request 110 from participant 20 is a subsequent request for an existing cached page of application response information 125 formerly provided from the application server 50 in response to another formerly received request (e.g. 100) from another participant to the shared session.

To do so, in step 426, the collaboration adapter 200 determines if the requested page exists as a cached page 208 of application response information. If the requested page exists, the collaboration adapter processing proceeds to step 427, as explained below. Alternatively, in step 426, if the collaboration adapter 200 determines that the application response information (i.e., a web page containing such information) requested in request 110 from participant 20 does not exist as a page of cached application response information 208 within the shared session state 205, collaboration adapter processing proceeds to steps 403 through 407 of FIG. 5.

As explained above, steps 403 through 407 generally cause the web server 30 to obtain the requested page on behalf of the shared session. Since the request 120 is made by the web server 30 on behalf of the shared session, the collaboration adapter 200 substitutes participant identification information 206-2 in the request 110 (participant 20's request) within the HTTP session state 34-2 associated with participant 20 (step 403) with shared session identification information 207 (request, cookie and identity information associated with owner participant 10), such that the original request 110 is converted into an altered request 120 that appears, from the perspective of the application server 50, to be originating on behalf of the identity associated with the shared session. After step 426 initiates and completes processing of steps 403 through 407, the collaboration adapter 200 returns control to step 428 which is explained below.

If the collaboration adapter 200 in step 426 determines that the cached pages 208 contain a copy of the requested application response information, then in step 427, the collaboration adapter 200 returns (via path 214) a cached copy of the application response information 208-1 (obtained when participant 10 established the shared session) associated with the shared session to the HTTP handler interceptor 32 along with the shared session and shared session participant cookies/IDs. That is, in step 427, the collaboration adapter 200 which generates the shared session and shared session participant cookies in step 424 passes these cookies along with a copy of the requested application response information 208 to the HTTP handler interceptor 32 to be returned to the requesting participant 20.

Finally, in step 428, the HTTP handler interceptor 32 returns the resulting web page 115 to the participant 20 (i.e., to the participant 20 associated with the session 34-2 in which the request 110 resides). The resulting web page 115 includes the shared session cookie from the shared session identification information 207 identifying the shared session state 205 and the shared session participant cookie from the participant identification information 206-2 (for participant 20). However, since participant 20 is not the owner of the shared session, the collaboration adapter 200 excludes from the resulting web page 115 any application-specific cookies contained within the application response information 208. As such, after the processing of step 428 is complete, the browser associated with participant 20 will contain the unique shared session participant identification cookie which can uniquely identify the participant 20, as well as a cookie identifying the shared session to which that participant is a member, but will not contain any application specific cookies.

The page of application response information 208-1 which the collaboration adapter 200 provides to participant 20 as the resulting web page 115 thus contains application transactional information generated as a result of participant 10 interacting with the application server 50 via shared session. In other words, participant 20 can become part of a session between the web server 30 and participant 10.

As explained above, the collaboration adapter 200 allows the web server 30 to receive a request from a participant to access the application via a shared session and can substitute participant session identification information within the initial request with shared session identification information. Once a shared session is established, the collaboration adapter 200 causes the standard HTTP handler 36 to forward all requests for new pages (that the web server 30 has not yet obtained from the application server 50) to the application server 50 using identity information associated with shared session, irrespective of any identity associated with whichever participant initiated the request for the new page. In other words, the shared session itself operates as the only participant with whom the application server 50 interacts, even though multiple participants may be viewing shared session information.

Shared Session Data Management

Figure 6:
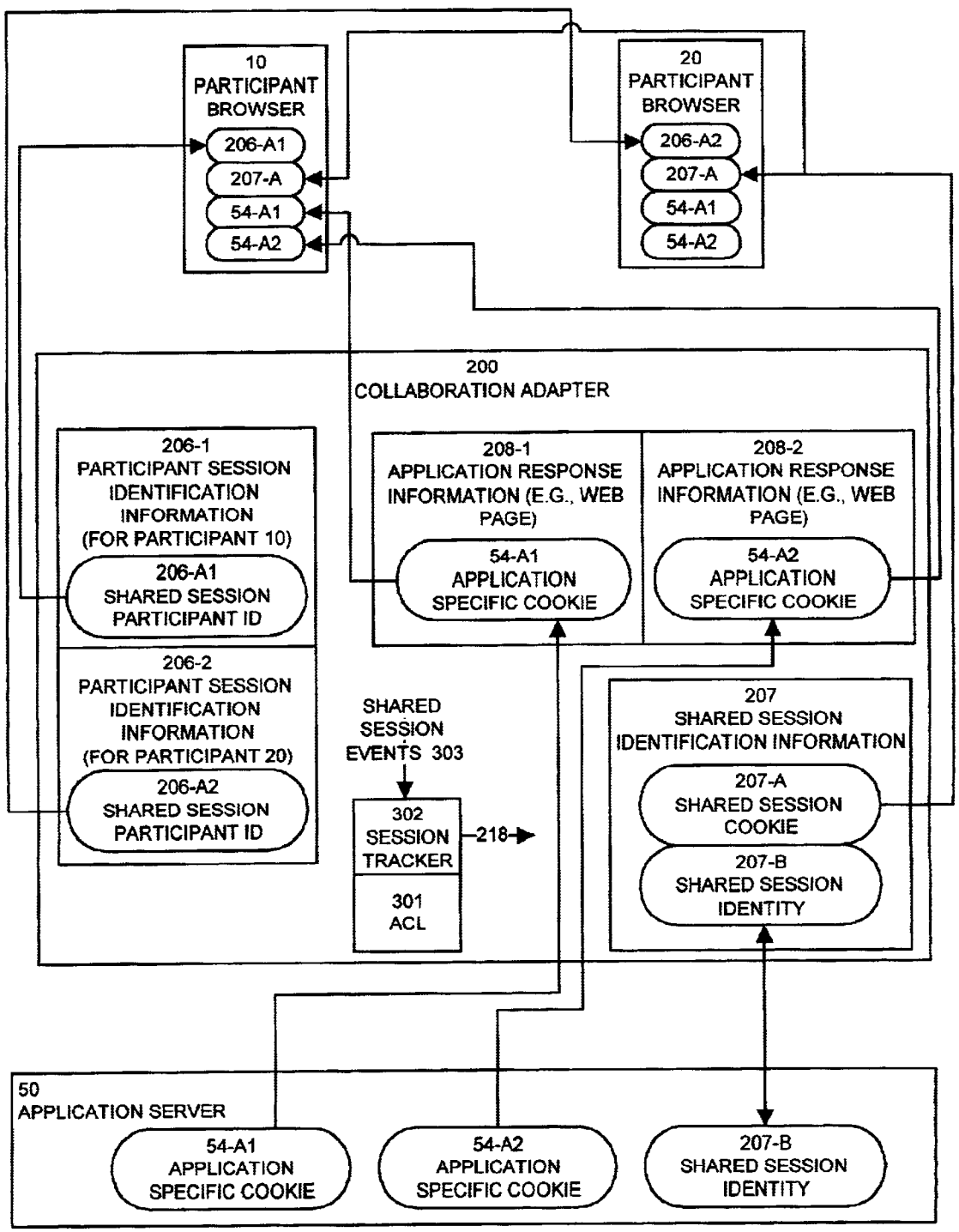
FIG. 6 provides a more detailed example illustration showing certain exchanges of information used by the invention between participant browsers, a web server and an application server in accordance with certain embodiments of the invention.

FIG. 6 graphically illustrates more detail concerning the information exchanged according to embodiments of the invention between participant browsers 10, 20, the Web server 30 and the application server 50. In addition to the existing data structures that have already been discussed, FIG. 6 also illustrates embodiments of the invention that include an access control list (ACL) 301 to control participant access to shared sessions and a session tracker 302 which assists in session management, which will be discussed in more detail later.

Upon creation of a shared session, the collaboration adapter 200 establishes the shared session identification information 207 containing a unique shared session identity 207-B on behalf of the participant claiming ownership of the shared session, which initially is the participant who creates the shared session. At this point, the collaboration adapter 200 causes the shared session identity 207-B to be exchanged between the Web server 30 and the application server 50 when handling all participant requests (e.g., 100, 110). The collaboration adapter 200 does not exchange the shared session identity 207-B with the participant browsers 10, 20. The collaboration adapter 200 also creates a unique shared session cookie 207-A that uniquely identifies the shared session.

Form this point on, when any participant joins (or creates, in the case of the first and owner participant) a shared session, the collaboration adapter establishes participant session identification information 206 for that participant and, as discussed above, creates a unique shared session participant ID 206-A1 (for participant 10), 206-A2 (for participant 20) for that participant and stores this ID 206-A within that participant's participant session identification information 206. Upon joining a shared session, the collaboration adapter 200 returns the shared session participant ID 206-A and the shared session cookie 207-A to the participant joining (or creating) the shared session.

As the web server 30 processes requests 100, 110, the collaboration adapter 200 alters session identity information contained in the HTTP headers of the requests (e.g., 100, 110) from the participants (e.g., 10, 20) into altered requests 120 containing the shared session identity 207-B as explained herein. The application server 50 produces various responses 125 to the altered requests 120 as pages of application response information 208-1, 208-2. Such responses 125 may also contain application-specific cookies 54-A1 and 54-A2.

Generally, the web server 30 serves pages of application response information 208 to shared session participant absent the application specific cookies 54-A. However, the collaboration adapter 200 does allow the application-specific cookies 54-A to be returned by the Web server 30 in pages served to the participant browser who is the owner of the shared session (e.g., participant 10 in the former examples). In other words, none of the participants to the shared session other than the shared session owner receive application specific cookies 54-A while under control of the shared session. This allows each participant to preserve their own identity for subsequent self-service interaction with the Web and application servers 30, 50. In other words, if owner participant of a shared session interacts with the application server 50 a later time, for instance after a shared session has ended, the application-specific cookies 54-A will be current and up-to-date with respect to the participant. However, other participants (e.g., 20) to the shared session may be unknown to exist from the perspective of the application server 50 since they will not contain copies of the application-specific cookies 54-A.

Since each participant browser 10, 20 includes a unique shared session participant ID 206-A that uniquely identifies the participant within the shared session identified by shared session cookie 207-A, the collaboration adapter 200 can associate subsequent requests for application response information pages 208 from participants to a shared session and can alter those requests appropriately to appear to be made on behalf of the shared session owner using the shared session identity 207-B.

Handling Redundant Page Operations

The collaboration adapter 200 can control redundant operations which participants to a shared session attempt to carry out on a single shared page of application response information 208 by maintaining versions associated with the cached pages 208 of application response information. In other words, as a shared session progresses, the participants to the shared session may submit requests for subsequent pages within the shared session. Since the application server 50 only interacts with the identity of one participant of the shared session (i.e., the owner participant, participant 10 in this example) the collaboration adapter 200 can assign a version or an order to the cached pages 208 of application response information.

As such, if two participants 10 and 20 attempt to operate on the same page 208-1, the collaboration adapter 200 will process the request (e.g. 110) of the first participant (e.g., participant 20) to act (i.e., to submit the request) and will receive a new resulting page of application response information 208-2 from the application server 50, as explained above. The collaboration adapter 200 can assign the more recent or higher version number to the current page 208-2, than a previous page 208-1 which contains an older or lower version number.

After the collaboration adapter 200 processes a request 110 based upon the first page 208-1 on behalf of the first requesting participant 20, the browser of the second participant 10 contains (i.e., the participant is viewing) a web page 208-1 that is no longer effective in operation or control of the shared session. When the second participant (participant 10) to act on the first page 208-1 subsequently attempts to submit a redundant operation to the Web server 30 based on the page 208-1 having an earlier version than the most recently received shared session page 208-2, the collaboration adapter 200 detects that the operation is redundant since there is an available higher version page 208-2 associated with shared session. As such, the collaboration adapter 200 can ignore the subsequent redundant request 100 and can forward the next higher version of an application response information page 208-2 that is cached to the participant providing the subsequent redundant request.

Since in certain embodiments, the collaboration adapter 200 can cache multiple pages of application response information 208, the collaboration adapter 200 allows shared session participants that fall behind in requesting the sequence of pages in the shared session (i.e., a participant may wait prolonged periods of time before submitting a request for the next page of the shared session, as opposed to other participants) to catch up by successively serving cached pages 208 to those participants with each participant request received. It may be unbeknownst to the participants that are behind schedule in receiving viewing pages 208 of the shared session that the collaboration adapter 200 does not actually forward their requests for processing to the application server 50. Instead, the collaboration adapter 200 can merely serve the next version of a cached page 208 based on a current version specified in the request from the participant.

If the collaboration adapter 200 receives a subsequent request after a former request for the same page is still being processed by the application server 50, the collaboration adapter 200, in one embodiment, can return a page to the subsequent (i.e., the second) requesting participant that indicates that the application server 50 is busy processing the same request for the same page from another participant. The collaboration adapter 200 can buffer the subsequent request (i.e., the second request) and can serve the resulting page the each requesting participant that submitted a request for this page one the page is obtained.

Ownership and Transfer of Ownership of Shared Sessions

Transferring shared session ownership from the participant who creates the shared session to another participant is possible in the system of the invention via the use of the session tracker 302. Either the owner participant of the shared session (as specified within the shared session identity 207-B) or a privileged user such as a collaboration adapter systems administrator (not shown) can supply a transfer ownership command within an HTTP request (e.g., 100, 110) such that the collaboration adapter 200 sends this command as an event 303 to the session tracker 301. As an example, owner participant 10 may send an HTTP request 100 that includes a shared session transfer ownership command to cause the collaboration adapter 200 to transfer ownership of the shared session from participant 10 to participant 20. The collaboration adapter 200 treats such a command as an event 303 (FIG. 6) and passes the command to the session tracker 302.

In response to receiving an event 303 that specifies transferor of ownership of the shared session, the session tracker 302 can alter the shared session identity 207-B to contain the identity of the new participant owner (e.g., participant 10) of the shared session. Once transferred, the session tracker 302 can copy all identifying shared session identification information 207 associated with the original participant owner (e.g., application specific cookies 54-A) from the original owner participant session identification information 206-1 (e.g., for participant 10) to the participant session identification information 206-2 associated with the new owner participant 20. In other words, new shared session identification information 207 for the new owner can be created based on the new owners participant session identification information 206 and portions of existing state information from the shared session identification information 207 can be maintained, such as cookies, so that the new owner identity can take over as the shared session identity where the previous owner identity left off.

Shared Session Security

The collaboration adapter 200 can control participant access to a shared session via the use of an access control list (ACL) 301. The participant owner of a shared session is generally responsible of the creation of the ACL. Once a participant owner of a shared session creates an ACL ownership session, the collaboration adept or 200 treats the shared session as a restricted shared session. An ACL can identify each participant allowed to join and interact with the shared session and can annual rate operations are excepted from each participant by the Web server 30. For example, an ACL may specify that a particular participant be allowed to read a page of application response information 208-1 but may not be allowed to submit requests for other pages based on that page 208-1.

The collaboration adapter 200 also allows the owner participant of the shared session or another privileged user to create or modify the ACL anytime to add and/or remove participants from the ACL or to adjust privileges on a participant by participant basis in the ACL. The participant owner of a shared session can provide ACL commands to perform these ACL operations to the collaboration adapter 200 through the HTTP handler interceptor 32. The HTTP handler interceptor 32 forwards these ACL commands as one or more shared session events to the session tracker 302 which then modifies the ACL 301 accordingly. In this manner, the owner of a shared session can regulate participant participation in the shared session. If no ACL is associated with a shared session, any participant is allowed to join and control a shared session via requests from pages in the shared session in an unrestricted manner.

Shared Session Control Interface

Figure 7:
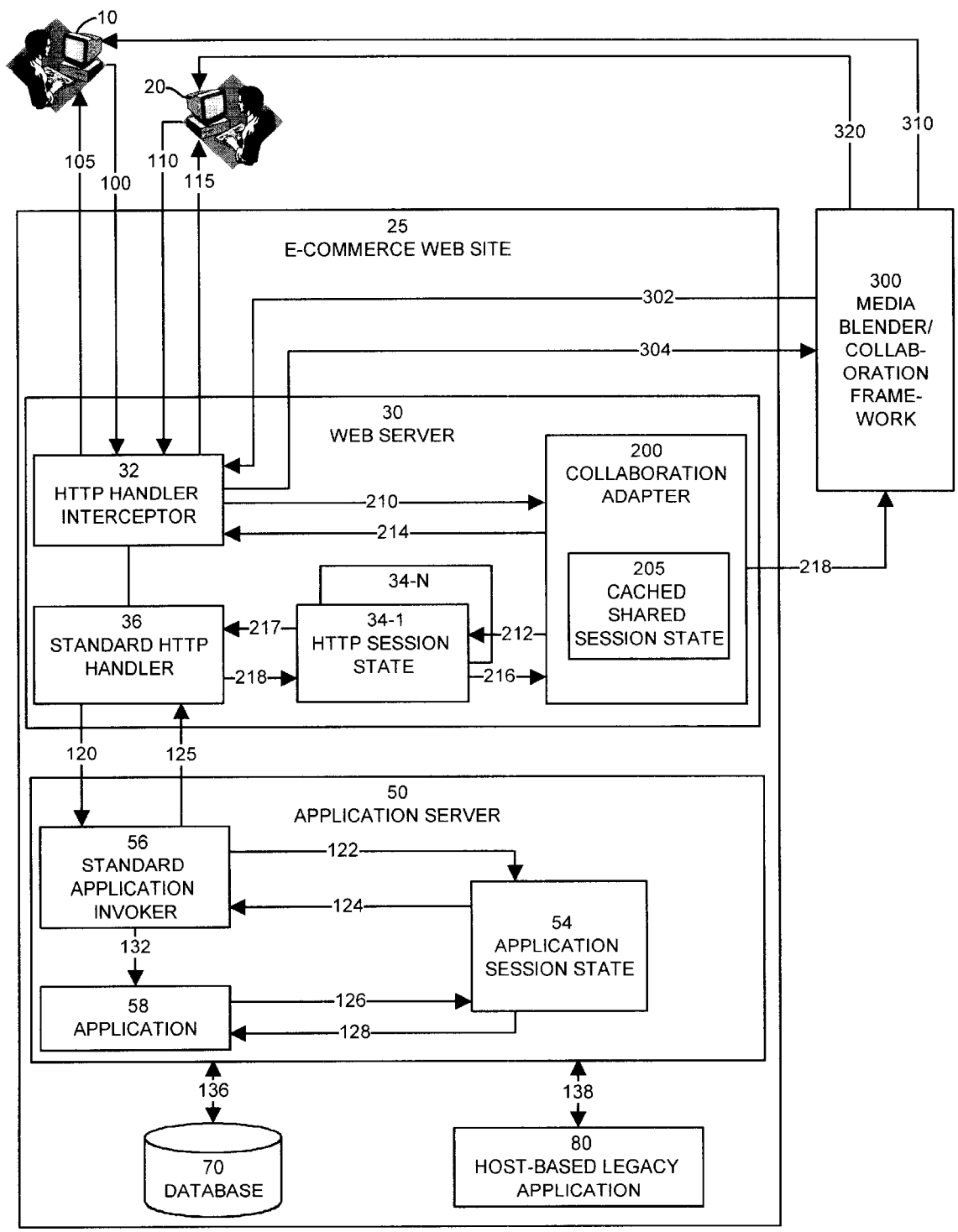
FIG. 7 illustrates an alternative architecture of an e-commerce web site configured in accordance with one embodiment of the invention that uses a collaboration framework to indicate shared session events to participants and a web server operating a shared session.

FIG. 7 illustrates an alternative embodiment of the invention in which a media blender/collaboration framework 300 interfaces 218 with the web server 30 of the e-commerce web site 25 and participant browsers 10 and 20. The complete operation of the media blender/collaboration framework 300 included in this embodiment is explained in detail in co-pending U.S. patent application Ser. No. 8/852,764, filed May 7, 1997, and entitled "Methods and Apparatus for Coordinating Internet Multi-Media Content with Telephone and Audio Communications," the entire teachings and contents of which are hereby incorporated by reference in their entirety.

Generally, a web server 30 configured in accordance with invention provides shared session control interfaces 302, 304 and 218 to support third party control and/or shared session event notification related to shared sessions within the web server 30. In this example, the media blender/collaboration framework 300 enables the participants 10, 20 to obtain the name of the collaborative shared session(s) 205 via communications channels 310, 320 since the framework 300 interfaces 218 with the collaboration adapter 200 and is aware of the existence of shared session state(s) 205 (one for each shared session). In other words, the collaboration adapter (also referred to as a controller in the patent application having Ser. No. 8/852,764) can indicate which shared session exist to the framework 300 and the framework 300 can relay this information to the participants 10, 20 or any other participants of one or more other shared sessions.

The collaboration adapter 200 can also make the framework 300 aware of any new pages of application response information 208 within a shared session which the collaboration adapter 200 caches when such pages are returned from the application server 50 during the shared session. As such, the framework 300 can manage the communication channels 310,320 to notify the participants 10, 20 of new or existing sessions, and when a participant joins one or more of such sessions, the framework 300 indicates to those participants in a session when a new page of application response information 208 is available for retrieval from the web server 30. The participants 10, 20 can then request 110, 115 the next page of application response information 208 from the web server 30 and the requests 110,115 can be accompanied by the shared session and shared session participant identification information.

In an alternative embodiment, a privileged user can control a shared session once the privileged user is authenticated to the web server 30. The media blender/collaboration framework 300 is an example of a privileged user. Within the collaboration adapter 200, the session tracker 302 can send and receive external event information 301 to control shared session events, operation and progression. The framework 300 includes shared session management services (not specifically shown) that can use the HTTP communications channel API 302, 304 and 218 in conjunction with the session tracker 302 to create and terminate shared sessions, add or remove participants from shared sessions, define shared session owners, create and modify shared session ACL's, detect changes in shared session page content and generally control the collaboration adapter 200.

Controlling the Lifetime of a Shared Session

The continued existence of a shared session within a collaboration adapter 200 is generally governed by the lifetime of the various participant HTTP sessions associated with the shared session and the owner participant session associated with the shared session. In one embodiment, if the participant owner terminates him or herself in a restricted shared session (e.g., a shared session using ACL's), the collaboration adapter 200 cascades this termination event to all remaining participants of the shared session. Thus at anytime, the owner of the shared session or a privileged user can terminate the shared session. Upon participant termination, each participant browser returns to its original behavior In an alternative embodiment, a privileged user such as the media Bender/collaboration framework 300 can terminate in a shared session based on such factors as inactivity, in each or some other external event. If a shared session is terminated in his manner, the collaboration adapter 200 is notified of the termination event via the session tracker 302 and each shared session participant 10, 20 is dropped from the shared session and the shared session state 205 is cleared from the cache memory. In this manner, the lifetime of a shared session participant with respect to the shared session is controlled by the lifetime of the participants HTTP session with the web server 30.

In addition to complete shared session termination, any shared session participant can voluntarily terminate his or participation in a shared session by either terminating that participants HTTP session with the web server 30, or by specifying an exit-shared-session-participant command within an HTTP request associated with the shared session. When a participant exits a shared session, the participants original HTTP session with the Web server 30 can remain intact and the collaboration adapter 200 will discontinue altering the HTTP session state 34 associated with that participants session with the Web server 30. That is, the collaboration adapter 200 will no longer alter requests 100, 110 made by a participant who exits a shared session.

Distributed Shared Sessions

Figure 8:
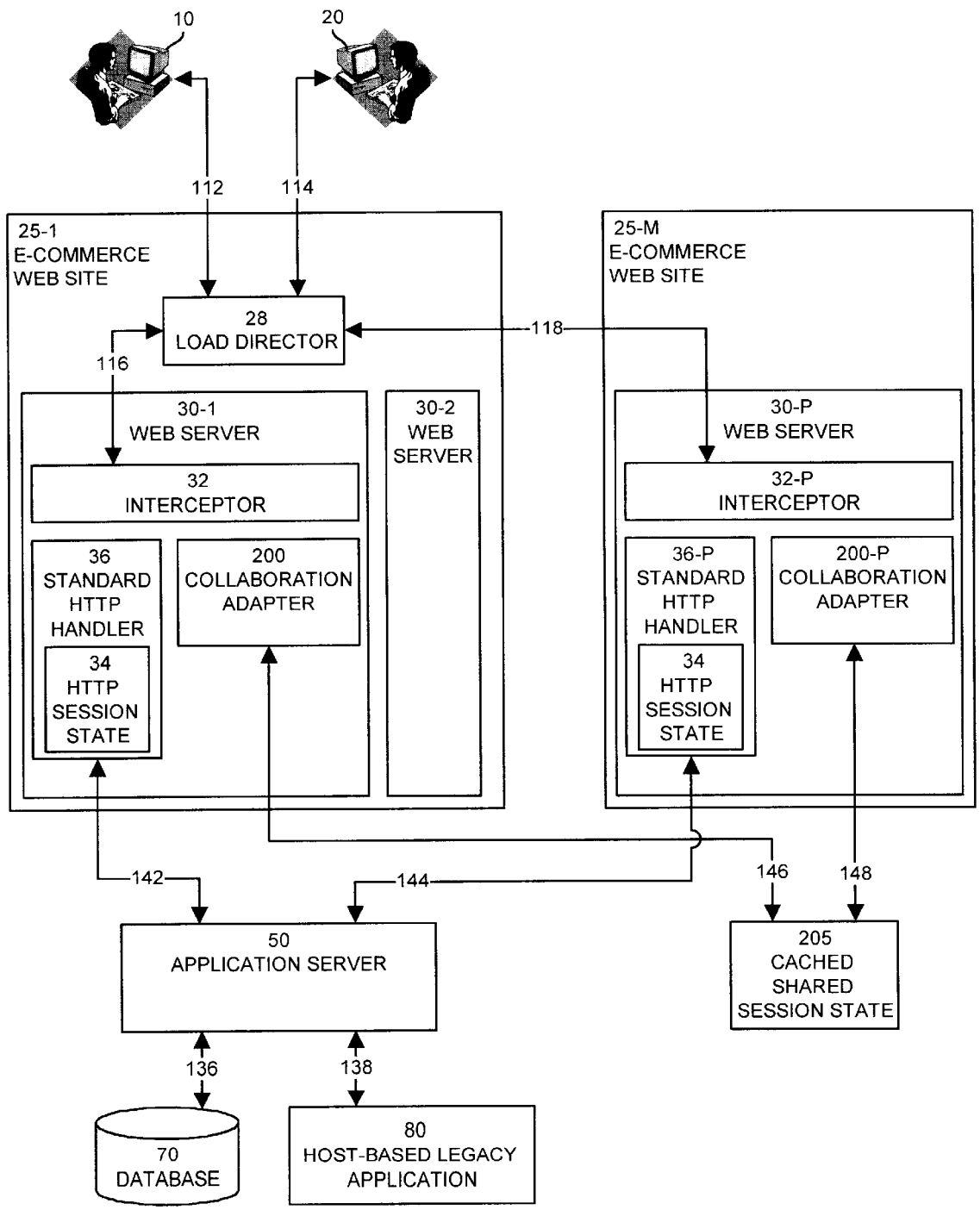
FIG. 8 illustrates an alternative distributed architecture of an e-commerce web site in configured in accordance with one embodiment of the invention.

FIG. 8 illustrates an alternative implementation of a system of the invention in which an e-commerce Web site 25 having multiple network locations 25-1 through 25-M (i.e., a distributed, national or international e-commerce web site) uses a load director 28 to distribute participant HTTP sessions 112, 114 across multiple web servers 30-1, 30-P. In this embodiment, participant HTTP sessions 112,114 may be directed to one or more particular web servers 30-1 through 30-P as shown by communication channels 116,118.

In order to support a shared session across multiple web servers 30 in this manner, the system of the invention provides a distributed shared session state 205 that each collaboration a adapter 200-1 through 200-P can access via communication channels 146,148. The system of the invention can distribute the distributed shared session state 205 by replication methods or by providing a centralized shared sessions state server (not shown) that is accessible by each collaboration adapter 200. In this manner, the collaboration adapters 200 within each web server 30 can access all participant information related to the shared session, no matter which web server 30 receives or handles a request for a participant operation related to the shared session.

Application Server Use of a Collaboration Adapter

Figure 9:
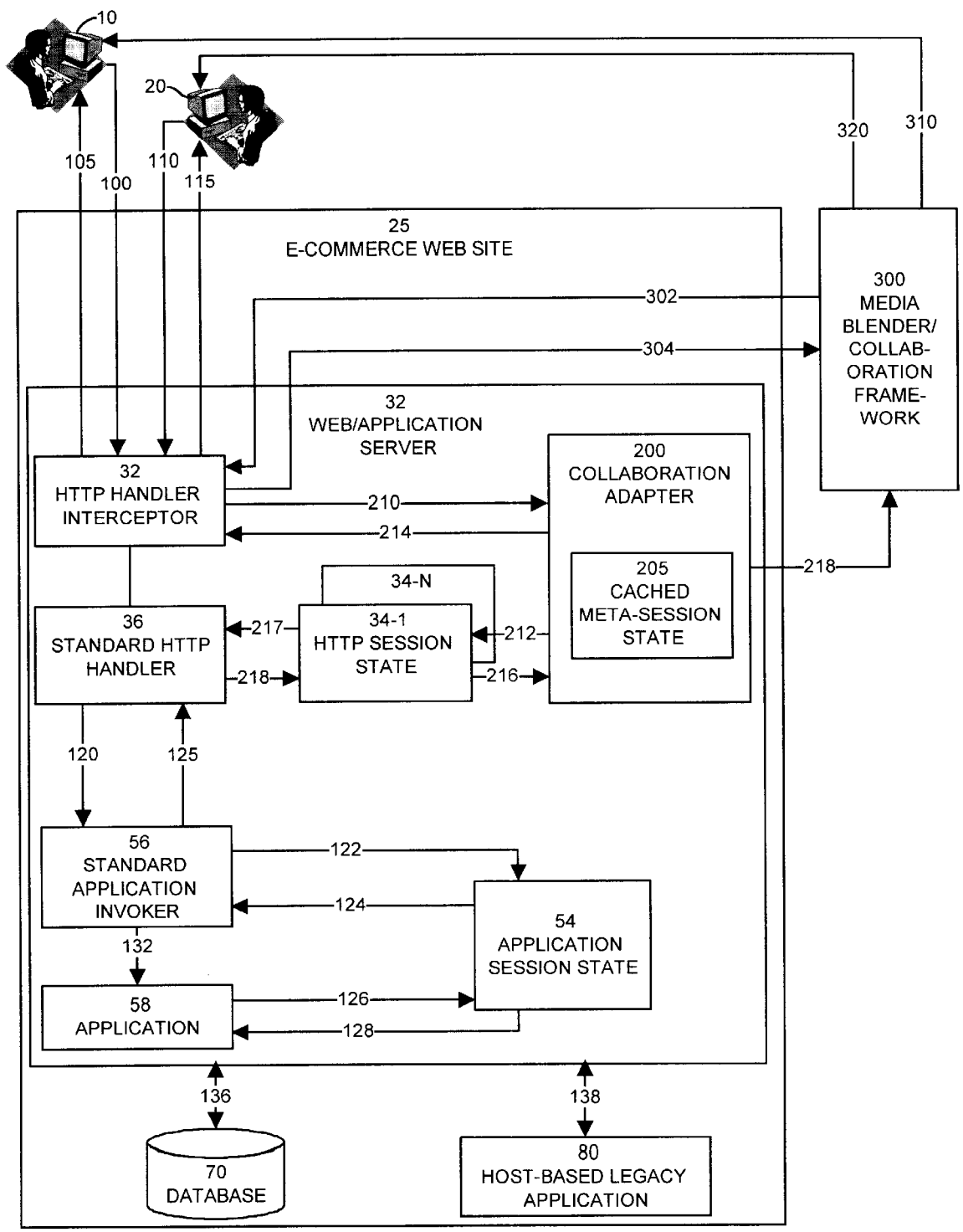
FIG. 9 illustrates an alternative architecture of an e-commerce web site in which a combined web and application server are equipped with a collaboration adapter configured in accordance with the invention.

FIG. 9 illustrates another alternative configuration of an embodiment of the invention in which the system of the invention does not require an independent application server 50, as in the former example embodiments. In this configuration, a web/application server 32 incorporates the collaboration adapter 200 as well as the functionality of the application server 50 from the former embodiments. As such, the system of the invention is equally applicable to "in process" applications that include a web server that incorporates the application being served. Examples of such embedded applications within a web server are servlets, ISAPI or NSAPI dll's, and stateless script-based applications implemented in a scripting language such as Perl, for example.

Multiple Views of Shared Session Data for Different Participants

Generally, each of the embodiments of the system of the invention discussed above are transparent to the application server 50 or application 58. That is, the application 58 operates with the impression that a single user is providing all requests for transactional information to the application 58. Moreover, each of the embodiments appalled generally assumes that each of the participants to a shared session shares data in an identical manner such each participant receives the same view of all pages of application response information 208.

Figure 10:
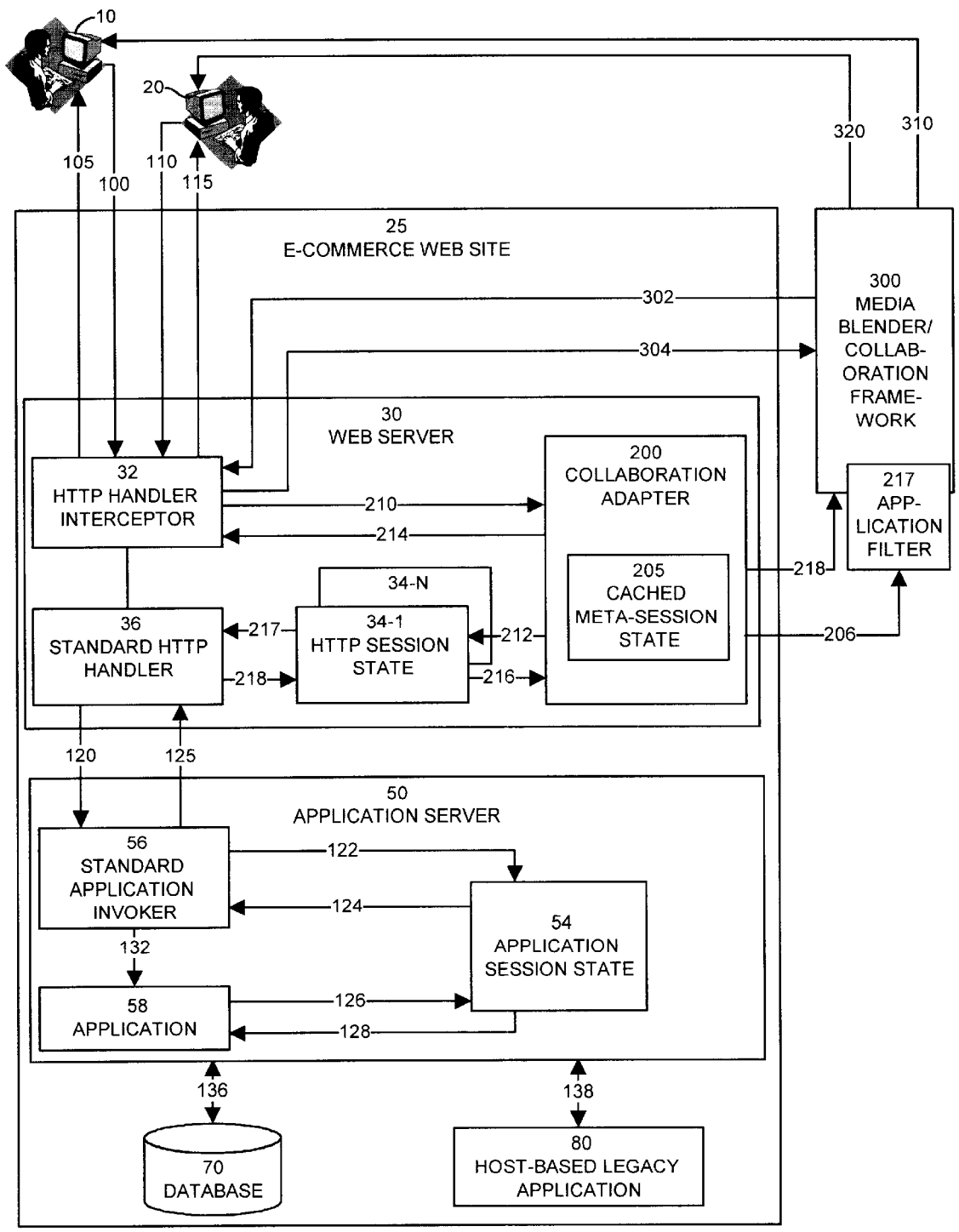
FIG. 10 illustrates an alternative architecture of an e-commerce web site that includes an application filter that can add or remove content from application response information based on an identity of a participant requestor according to certain embodiments of the invention.

FIG. 10 illustrates an example configuration of an embodiment of the invention in which multiple participants may share pages of application response information 208 related to a shared session concurrently wherein such pages 208 may be presented as different views to different participants. To do so, the system of the invention can identify various roles associated with different participants to a shared session. For example, one participant might be an agent or representative of the company or other institution providing the e-commerce web site 25, while other participants to the shared session may be customers requiring assistance while interacting with the application 58.

The agent participant may not require or desire to view the entire contents of a page of the application response information 208 within the shared session. Such pages 208 may contained advertisement information, for example, that is not related to the agent's job or function. As an alternative example, a page of application response information 208 intended for a customer participant may include data and/or functionality (e.g., buttons authorizing the submission of customer information to complete a sale of a retail item) that the agent participant should not be allowed to exercise.

In this example embodiment, an application filter 217 is incorporated between the collaboration adapter 200 and the media blender/collaboration framework 300. In operation to this embodiment, the collaboration adapter 200 can provide participant session identification information 206 upon receipt of a request 100, 110 from a participant 10, 20 to the shared session. Based on this information 206, the application filter 217 determine the identity of the participant requesting a page (e.g., agent versus customer) and can provide a signal 302 to the HTTP handler interceptor 32. The signal 302 can indicate what information is to be added or removed to the page 208 being served by the web server 30 to this participant in response to the participant request. In other words, the identity or role of a participant in a shared session can be used to determine the content of a page of application response information 208 that is returned to that participant in response to a request from that participant.

The present invention provides a system which allows a web server to provide shared access by multiple participants to a single session of interaction with an application. This allows a single application session to be viewed and controlled by multiple participant computer users over a network such as the Internet. The present invention is particularly useful in the e-commerce web site platforms which benefit from collaborative sessions in which multiple participant computer users can interact with a single communications session directed to an application server.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for providing participant access to an application, the method comprising the steps of:

receiving a first request from a first participant via a first participant session to access the application via a shared session, the shared session allowing access to the application by at least one participant;

substituting participant session identification information identifying the first participant session within the first request with shared session identification information identifying the shared session to create an altered request; and forwarding the altered request to the application such that the application operates to produce application response information in accordance with shared session identification information contained in the altered request, independently of participant session identification information contained in the first request.

2. The method of claim 1 further including the steps of:

receiving application response information from the application in response to operating on the altered request;

caching the application response information in a cache of application response information; and forwarding the application response information to the first participant via the first participant session to allow the first participant to access the application via the shared session.

3. The method of claim 2 further including the steps of:

identifying a second request received from a second participant via a second participant session as a request to join the shared session to access the application; and forwarding the application response information that is cached to the second participant via the second participant session such that the application does not need to process the second request.

4. The method of claim 2 wherein the step of forwarding includes substituting shared session identification information in the application response information with participant session identification information, such that the application response information is forwarded to the first participant using a response associated with the first participant session.

5. The method of claim 1 including steps of:

generating shared session identification information that uniquely identifies the shared session;

associating the first participant session to the shared session;

generating shared session participant information for the first participant, the shared session participant information for the first participant uniquely identifying the first participant as a participant in the shared session; and providing the shared session participant information to the first participant via the first participant session.

6. The method of claim 1 further including the step of:

determining if application response information appropriate to the request is present in a cache of application response information, and if so, forwarding the application response information appropriate to the request from the cache to the participant via the participant session such that the request does not have to be processed by the application via the shared session, and if not, performing the steps of substituting and forwarding to obtain application response information appropriate to the request.

7. The method of claim 1, wherein the first participant uses a web browser to generate the first request and the application is run on a web-based server device that generates and transmits the response information depending on the first request, the application receiving additional requests from other participants of the shared session, the web-based server supporting concurrent access by the other participants to response information generated on behalf of the first participant.

8. The method of claim 7, wherein the first participant is an agent that controls which response information is generated by the application during the shared session, and the other participants of the shared session selectively obtain different portions of the response information based on the additional requests to the application by the other participants of the shared session.

9. The method of claim 8, wherein the application serves appropriate response information to the other participants based on the additional requests, the application at the web-based appearing to receive the additional requests from the agent even though the additional requests are received from the other participants.

10. The method of claim 9, wherein the different portions of response information are utilized by the other participants to view different portions of web page information.

11. A method for providing participant access to an application, the method comprising the steps of:

receiving a first request from a first participant via a first participant session to access the application via a shared session, the shared session allowing access to the application by at least one participant;

substituting participant session identification information identifying the first participant session within the first request with shared session identification information identifying the shared session to create an altered request;

forwarding the altered request to the application such that the application operates to produce application response information in accordance with shared session identification information contained in the altered request, independently of participant session identification information contained in the first request; and determining if the first participant is an owner of the shared session, and if so, including any application specific state information within the application response information forwarded to the first participant, and if not, excluding any application specific state information within the application response information forwarded to the first participant.

12. The method of claim 11 further including the step of:

associating the second participant session to the shared session.

13. The method of claim 12 further including the step of:

identifying the first request from the first participant as a request to create a shared session.

14. The method of claim 13 wherein:

the step of generating shared session identification information that uniquely identifies the shared session generates the shared session identification information based on the first request from the first participant which causes the first participant to be the owner of the shared session; and wherein the shared session identification information includes at least one of:
 i: participant identification information associated with the first participant;
 ii: a name associated with the shared session;
 iii: access control information associated with the first participant that is required to access the application;
 iv: communications response buffer information associated with the first participant session; and
 v: a network address associated with the first participant session.

15. The method of claim 12 wherein the step of associating a session of the participant providing the second request includes the steps of:

generating shared session participant identification information for the second participant; and associating the shared session participant identification information for the second participant to the shared session; and wherein the step of forwarding the application response information that is received in response to the altered request to the second participant includes the step of providing the shared session participant identification information generated for the second participant to the second participant along with the application response information.

16. A method for providing multiple participant access to an application via a shared session, the method comprising the steps of:

receiving a request from a participant via a participant session to access the application via the shared session; and determining if application response information appropriate to the request is present in a cache of application response information, and if so, forwarding the application response information appropriate to the request from the cache to the participant via the participant session such that the request does not have to be processed by the application via the shared session, and if not, performing the steps of:
 substituting participant session identification information identifying the participant session within the request with shared session identification information identifying the shared session to create an altered request; and
 forwarding the altered request to the application such that the application operates to produce application response information in accordance with shared session identification information contained in the altered request, independently of participant session identification information contained in the request.

17. The method of claim 16 wherein the step of determining further includes the steps of:

receiving application response information from the application in response to the application operating on the altered request;

caching the application response information in the cache of application response information; and forwarding the application response information received in response to the application operating on the altered request to the participant via the participant session to allow the participant to access the application via the shared session.

18. The method of claim 17 further including the steps of:

receiving a second request from a second participant via a second participant session to access application response information received in response to the application forwarding the altered request; and in response to receiving the second request, forwarding the application response information cached in response to the application forwarding the altered request to the second participant via the second participant session to allow the second participant to access the application response information via the shared session without requiring the application to operate on the second request.

19. The method of claim 18 wherein if the second request is received before completion of the step of receiving application response information from the application in response to the application operating on the altered request, the method performs the steps of:

forwarding a predefined response to the second participant via the second participant session indicating that the application response information requested is not yet available; and deferring processing of the step of forwarding the application response information in response to receiving the second request until the application has operated on the altered request to produce the application response information requested in the first and second requests.

20. The method of claim 18, wherein the step of forwarding the application response information include the step of:

determining if a participant requesting the application response information is the owner of the shared session, and if so, including application specific state information within the application response information before forwarding the application response information, and if not, excluding application specific state information within the application response information before forwarding the application response information.

21. The method of claim 16, wherein the steps of forwarding the application response information include the steps of:

determining an identity of a participant requesting the application response information;

altering content of the application response information based on the identity of the participant requesting the application response information; and forwarding the application response information to the participant requesting the application response information.

22. The method of claim 16 wherein the step of forwarding the altered request includes the steps of:

determining a participant identity of a first participant requesting the application response information; and including the identity of the first participant in the altered request in addition to shared session identification information to allow the application to conditionally operate on the altered request based on the identity of the participant, independently of shared session identification information contained in the altered request.

23. The method of claim 16 further including the step of:

deciding if the request is valid to access the application via the shared session by consulting an access control list associated with the shared session, and if so, allowing access to the shared session by the first participant as specified in the access control list, and if not, rejecting access to the shared session by the first participant.

24. The method of claim 16 including the steps of:

receiving a subsequent request from a participant to the shared session to access the application response information requested in the first request; and determining if the application response information is available without forwarding an altered request to the application, and if so, forwarding the application response information to the participant to the shared session originating the subsequent request.

25. The method of claim 16 wherein the step of receiving a first request includes the steps of:

detecting a transfer shared session ownership command within the first request; and authenticating that the participant is authorized to transfer ownership of the shared session, and if so, substituting a shared session participant identity defined within the shared session identification information with shared session participant identification associated with the participant, such that the participant becomes the owner of the shared session.

26. The method of claim 16, wherein the shared session identification information is distributed and accessible by multiple collaborative servers.

27. The method of claim 16, wherein a first participant uses a web browser to generate a first request to create a shared session, and the application is run on a web-based server device that generates and transmits the application response information depending on the first request, the application receiving additional requests from other participants of the shared session, the web-based server supporting concurrent access by the other participants to application response information generated on behalf of the first participant.

28. The method of claim 27, wherein the first participant is an agent that controls which application response information is generated by the application during the shared session, and the other participants of the shared session selectively obtain different portions of the application response information based on the additional requests to the application by the other participants of the shared session.

29. The method of claim 28, wherein the application serves appropriate application response information to the other participants based on the additional requests, the application at the web-based server device appearing as though to receive the additional requests from the agent even though the additional requests are received from the other participants.

30. The method of claim 29, wherein the different portions of response information are utilized by the other participants to view different portions of web page information generated by the web-based server.

31. A computer system providing participant access to an application, the computer system comprising:

an input/output interface at least one memory system; and a processor coupled to the input/output interface and the at least one memory system;

the at least one memory system encoded with an application and a server process including a collaboration adapter that, when performed on the processor, causes the computer system to perform the operations of:

receiving, over the input/output interface, a first request from a first participant via a first participant session to access the application via a shared session between the web server and the application, the shared session allowing access to the application by at least one participant;

substituting, in the at least one memory system, participant session identification information identifying the first participant session within the first request with shared session identification information identifying the shared session to create an altered request;

forwarding the altered request to the application such that the application operates to produce application response information in accordance with shared session identification information contained in the altered request, independently of participant session identification information contained in the first request; and determining if application response information appropriate to the request is present in a cache of application response information, and if so, forwarding the application response information appropriate to the request from the cache to the participant via the participant session such that the request does not have to be processed by the application via the shared session, and if not, performing the steps of substituting and forwarding to obtain application response information appropriate to the request.

32. The computer system of claim 31 wherein the processor performs the web server process including the collaboration adapter to cause the computer system to further perform the operations of:

receiving application response information from the application in response to operating on the altered request;

caching the application response information in a cache of application response information in the at least one memory system; and forwarding the application response information to the first participant over the input/output interface via the first participant session to allow the first participant to access the application via the shared session.

33. The computer system of claim 32 wherein when the processor performs the step of forwarding, the processor performs operations including substituting shared session identification information in the application response information with participant session identification information, such that the application response information is forwarded to the first participant using a response associated with the first participant session.

34. The computer system of claim 31 wherein when the processor performs the operation of associating a session of the participant providing second request, the processor further causes the computer system to perform the operations of:
   generating shared session participant identification information for the second participant;
   associating the shared session participant identification information for the second participant to the shared session; and
   wherein the operation of forwarding the application response information that is received in response to the altered request to the second participant includes an operation of providing the shared session participant identification information generated for the second participant to the second participant over the input/output interface along with the application response information.

35. The computer system of claim 31 wherein the processor performs the web server process including the collaboration adapter to cause the computer system to further perform the operations of:
   identifying the first request from the first participant as a request to create a shared session;
   generating shared session identification information that uniquely identifies the shared session;
   associating the first participant session to the shared session;
   generating shared session participant information for the first participant, the shared session participant information for the first participant uniquely identifying the first participant as a participant in the shared session; and
   providing the shared session participant information to the first participant via the first participant session.

36. The computer system of claim 35 wherein the processor further performs operation of:
   identifying the first request from the first participant as a request to create a shared session.

37. The computer system of claim 35 wherein when the processor performs the web server process including the collaboration adapter to cause the computer system to perform the operation of generating shared session identification information that uniquely identifies the shared session, the processor further performs the operation of generating the shared session identification information based on the first request from the first participant which causes the first participant to be the owner of the shared session; and
   wherein the shared session identification information includes at least one of:
      i: participant identification information associated with the first participant;
      ii: a name associated with the shared session;
      iii: access control information associated with the first participant that is required to access the application;
      iv: communications response buffer information associated with the first participant session; and
      v: a network address associated with the first participant session.

38. The computer system of claim 31 wherein the processor performs the web server process including the collaboration adapter to cause the computer system to further perform the operations of:
   determining if application response information appropriate to the request is present in a cache of application response information, and if so, forwarding the application response information appropriate to the request from the cache to the participant via the participant session such that the request does not have to be processed by the application via the shared session, and if not, performing the steps of substituting and forwarding to obtain application response information appropriate to the request.

39. The computer system of claim 31 wherein the server operates as a web server computing system and wherein the application operates as an application server computing system that is different than the web server computing system.

40. A computer system providing participant access to an application, the computer system comprising:
   an input/output interface
   at least one memory system; and
   a processor coupled to the input/output interface and the at least one memory system;
   the at least one memory system encoded with an application and a server process including a collaboration adapter that, when performed on the processor, causes the computer system to perform the operations of:
      receiving, over the input/output interface, a first request from a first participant via a first participant session to access the application via a shared session between the web server and the application, the shared session allowing access to the application by at least one participant;
      substituting, in the at least one memory system, participant session identification information identifying the first participant session within the first request with shared session identification information identifying the shared session to create an altered request; and
      forwarding the altered request to the application such that the application operates to produce application response information in accordance with shared session identification information contained in the altered request, independently of participant session identification information contained in the first request; and
      determining if the first participant is an owner of the shared session, and if so, including any application specific state information within the application response information forwarded to the first participant, and if not, excluding any application specific state information within the application response information forwarded to the first participant.

41. The computer system of claim 40 wherein the processor performs the web server process including the collaboration adapter to cause the computer system to further perform the operations of:
   identifying a second request received over the input/output interface from a second participant via a second participant session as a request to join the shared session to access the application; and
   forwarding the application response information that is cached over the input/output interface to the second participant via the second participant session such that the application does not need to process the second request.

42. The computer system arrangement of claim 41 wherein the processor further performs the operation of associating the second participant session to the shared session.

43. A computer system for providing multiple participant access to an application via a shared session, the computer system including:

an input/output interface at least one memory system; and a processor coupled to the input/output interface and the at least one memory system;

the at least one memory system encoded with an application and a web server process including a collaboration adapter that, when performed on the processor, causes the computer system to perform the operations of:

receiving a first request from a first participant via a first participant session to access the application via the shared session; and determining if application response information appropriate to the request is present in a cache of application response information, and if so, forwarding the application response information specified in the request from the cache to the participant via the participant session such that the request does not have to be processed by the application via the shared session, and if not, performing the steps of:

substituting participant session identification information identifying the participant session within the request with shared session identification information identifying the shared session to create an altered request; and forwarding the altered request to the application such that the application operates to produce application response information in accordance with shared session identification information contained in the altered request, independently of participant session identification information contained in the request.

44. The computer system of claim 43 wherein the processor performs the web server process including the collaboration adapter to cause the computer system to further perform the operations of:

receiving application response information from the application in response to the application operating on the altered request;

caching the application response information in the cache of application response information; and forwarding the application response information received in response to the application operating on the altered request to the participant via the participant session to allow the participant to access the application via the shared session.

45. The computer system of claim 43 wherein the processor performs the web server process including the collaboration adapter to cause the computer system to further perform the operations of:

receiving a second request from a second participant via a second participant session to access application response information received in response to the application operating on the altered request; and in response to receiving the second request, forwarding the application response information cached in response to the application operating on the altered request to the second participant via the second participant session to allow the second participant to access the application response information via the shared session without requiring the application to operate on the second request.

46. The computer system of claim 45, wherein when the processor performs the steps of forwarding the application response information, the processor further causes the computer system to perform the operation of:

determining if a participant requesting the application response information is the owner of the shared session, and if so, including application specific state information within the application response information before forwarding the application response information over the input/output interface, and if not, excluding application specific state information within the application response information before forwarding the application response information over the input/output interface.

47. The computer system of claim 45, wherein when the processor performs the steps of forwarding the application response information, the processor further causes the computer system to perform the operations of:

determining an identity of a participant requesting the application response information;

altering content of the application response information based on the identity of the participant requesting the application response information; and forwarding the application response information to the participant requesting the application response information.

48. The computer system of claim 45 wherein if the second request is received over the input/output interface before completion of the step of receiving application response information from the application in response to the application operating on the altered request, the processor further causes the computer system to perform the operations of:

forwarding a predefined response to the second participant over the input/output interface via the second participant session indicating that the application response information requested is not yet available; and deferring processing of the step of forwarding the application response information in response to receiving the second request until the application has operated on the altered request to produce the application response information requested in the first and second requests.

49. The computer system of claim 43 wherein when the processor performs the steps of forwarding the altered request, the processor further causes the computer system to perform the operations of:

determining a participant identity of a first participant requesting the application response information; and including the identity of the first participant in the altered request in addition to shared session identification information to allow the application to conditionally operate on the altered request based on the identity of the participant, independently of shared session identification information contained in the altered request.

50. The computer system of claim 43 wherein the processor performs the web server process including the collaboration adapter to cause the computer system to further perform the operation of:

deciding if the request is valid to access the application via the shared session by consulting an access control list associated with the shared session, and if so, allowing access to the shared session by the first participant as specified in the access control list, and if not, rejecting access to the shared session by the first participant.

51. The computer system of claim 43 wherein the processor performs the web server process including the collaboration adapter to cause the computer system to further perform the operations of:

receiving, over the input/output interface, a subsequent request from a participant to the shared session to access the application response information requested in the first request; and determining if the application response information is available without forwarding an altered request to the application, and if so, forwarding the application response information to the participant to the shared session originating the subsequent request.

52. The computer system of claim 43 wherein when the processor performs the operation of receiving a first request, the processor causes the computer system to further perform the operations of:

detecting a transfer shared session ownership command within the first request; and authenticating that the participant is authorized to transfer ownership of the shared session, and if so, substituting a shared session participant identity defined within the shared session identification information with shared session participant identification associated with the participant, such that the participant becomes the owner of the shared session.

53. The computer system of claim 43, wherein the shared session identification information is distributed and accessible by multiple collaborative servers included within the computer system arrangement.

54. A computer program product having a computer-readable medium including computer program logic encoded thereon for providing multiple participant access to an application via a shared session, such that the computer program logic, when executed on at least one processing unit within the computerized device, causes the at least one processing unit to perform the steps of:

receiving a request from a participant via a participant session to access the application via the shared session; and determining if application response information appropriate to the request is present in a cache of application response information, and if so, forwarding the application response information appropriate to the request from the cache to the participant via the participant session such that the request does not have to be processed by the application via the shared session, and if not, performing the steps of:

substituting participant session identification information identifying the participant session within the request with shared session identification information identifying the shared session to create an altered request; and forwarding the altered request to the application such that the application operates to produce application response information in accordance with shared session identification information contained in the altered request, independently of participant session identification information contained in the request.

55. The computer program product of claim 54 wherein the computer program logic, when executed on the at least one processing unit, further causes the processing unit to perform the steps of:

receiving application response information from the application in response to the application operating on the altered request;

caching the application response information in the cache of application response information; and forwarding the application response information received in response to the application operating on the altered request to the participant via the participant session to allow the participant to access the application via the shared session.

56. The computer program product of claim 54 wherein the computer program logic, when executed on the at least one processing unit, further causes the processing unit to perform the steps of:

receiving a second request from a second participant via a second participant session to access application response information received in response to the application operating on the altered request; and in response to receiving the second request, forwarding the application response information cached in response to the application operating on the altered request to the second participant via the second participant session to allow the second participant to access the application response information via the shared session without requiring the application to operate on the second request.

* * * * *